(12) United States Patent
Benkreira et al.

(10) Patent No.: US 11,823,175 B2
(45) Date of Patent: Nov. 21, 2023

(54) INTELLIGENT CARD UNLOCK

(71) Applicant: Capital One Services, LLC, McLean, VA (US)

(72) Inventors: Abdelkader M'Hamed Benkreira, Washington, DC (US); Tyler Maiman, Melville, NY (US); Brendan Way, Brooklyn, NY (US)

(73) Assignee: Capital One Services, LLC, McLean, VA (US)

( * ) Notice: Subject to any disclaimer, the term of this patent is extended or adjusted under 35 U.S.C. 154(b) by 128 days.

(21) Appl. No.: 16/863,179

(22) Filed: Apr. 30, 2020

(65) Prior Publication Data

US 2021/0342816 A1    Nov. 4, 2021

(51) Int. Cl.
    *G06Q 20/34*    (2012.01)
    *G06K 7/10*    (2006.01)

(52) U.S. Cl.
    CPC ....... *G06Q 20/352* (2013.01); *G06K 7/10366* (2013.01)

(58) Field of Classification Search
    CPC .................. G06Q 20/352; G06K 7/103666
    See application file for complete search history.

(56) References Cited

U.S. PATENT DOCUMENTS

| | | | |
|---|---|---|---|
| 3,750,514 A | 8/1973 | Tanaka et al. | |
| 4,683,553 A | 7/1987 | Mollier | |
| 4,827,113 A | 5/1989 | Rikuna | |
| 4,910,773 A | 3/1990 | Hazard et al. | |
| 5,036,461 A | 7/1991 | Elliott et al. | |
| 5,363,448 A | 11/1994 | Koopman, Jr. et al. | |
| 5,377,270 A | 12/1994 | Koopman, Jr. et al. | |
| 5,533,126 A | 7/1996 | Hazard | |
| 5,537,314 A | 7/1996 | Kanter | |
| 5,592,553 A | 1/1997 | Guski et al. | |
| 5,616,901 A | 4/1997 | Crandall | |

(Continued)

FOREIGN PATENT DOCUMENTS

| CA | 3010336 A1 | 7/2017 |
|---|---|---|
| CN | 101192295 A | 6/2008 |

(Continued)

OTHER PUBLICATIONS

Maksim Avdyushkin et al., Secure Location Validation with Wi-Fi Geo-Fencing and NFC, Aug. 1, 2015, IEEE, pp. 890-896 (Year: 2015).*

(Continued)

*Primary Examiner* — Nilesh B Khatri
(74) *Attorney, Agent, or Firm* — KDW FIRM PLLC

(57) ABSTRACT

Various examples generally directed to unlocking a locked contactless card for use as payment in card-present transactions are provided. The contactless card is a payment card associated with a payment account. An application executing on a mobile device may be operable to enable unlocking the locked contactless card and receive an indication that the contactless card associated with the mobile device is unlocked for use in card-present transactions. The application may present information related to permitted uses of the unlocked contactless card via a graphical user interface. The permitted uses of the unlocked contactless card may be modified via the graphical user interface.

18 Claims, 9 Drawing Sheets

(56) References Cited

U.S. PATENT DOCUMENTS

| | | |
|---|---|---|
| 5,666,415 A | 9/1997 | Kaufman |
| 5,763,373 A | 6/1998 | Robinson et al. |
| 5,764,789 A | 6/1998 | Pare, Jr. et al. |
| 5,768,373 A | 6/1998 | Lohstroh et al. |
| 5,778,072 A | 7/1998 | Samar |
| 5,796,827 A | 8/1998 | Coppersmith et al. |
| 5,832,090 A | 11/1998 | Raspotnik |
| 5,883,810 A | 3/1999 | Franklin et al. |
| 5,901,874 A | 5/1999 | Deters |
| 5,929,413 A | 7/1999 | Gardner |
| 5,960,411 A | 9/1999 | Hartman et al. |
| 6,021,203 A | 2/2000 | Douceur et al. |
| 6,049,328 A | 4/2000 | Vanderheiden |
| 6,058,373 A | 5/2000 | Blinn et al. |
| 6,061,666 A | 5/2000 | Do et al. |
| 6,105,013 A | 8/2000 | Curry et al. |
| 6,199,114 B1 | 3/2001 | White et al. |
| 6,199,762 B1 | 3/2001 | Hohle |
| 6,216,227 B1 | 4/2001 | Goldstein et al. |
| 6,227,447 B1 | 5/2001 | Campisano |
| 6,282,522 B1 | 8/2001 | Davis et al. |
| 6,324,271 B1 | 11/2001 | Sawyer et al. |
| 6,342,844 B1 | 1/2002 | Rozin |
| 6,367,011 B1 | 4/2002 | Lee et al. |
| 6,402,028 B1 | 6/2002 | Graham, Jr. et al. |
| 6,438,550 B1 | 8/2002 | Doyle et al. |
| 6,501,847 B2 | 12/2002 | Helot et al. |
| 6,631,197 B1 | 10/2003 | Taenzer |
| 6,641,050 B2 | 11/2003 | Kelley et al. |
| 6,655,585 B2 | 12/2003 | Shinn |
| 6,662,020 B1 | 12/2003 | Aaro et al. |
| 6,721,706 B1 | 4/2004 | Strubbe et al. |
| 6,731,778 B1 | 5/2004 | Oda et al. |
| 6,779,115 B1 | 8/2004 | Naim |
| 6,792,533 B2 | 9/2004 | Jablon |
| 6,829,711 B1 | 12/2004 | Kwok et al. |
| 6,834,271 B1 | 12/2004 | Hodgson et al. |
| 6,834,795 B1 | 12/2004 | Rasmussen et al. |
| 6,852,031 B1 | 2/2005 | Rowe |
| 6,865,547 B1 | 3/2005 | Brake, Jr. et al. |
| 6,873,260 B2 | 3/2005 | Lancos et al. |
| 6,877,656 B1 | 4/2005 | Jaros et al. |
| 6,889,198 B2 | 5/2005 | Kawan |
| 6,905,411 B2 | 6/2005 | Nguyen et al. |
| 6,910,627 B1 | 6/2005 | Simpson-Young et al. |
| 6,971,031 B2 | 11/2005 | Haala |
| 6,990,588 B1 | 1/2006 | Yasukura |
| 7,006,986 B1 | 2/2006 | Sines et al. |
| 7,085,931 B1 | 8/2006 | Smith et al. |
| 7,127,605 B1 | 10/2006 | Montgomery et al. |
| 7,128,274 B2 | 10/2006 | Kelley et al. |
| 7,140,550 B2 | 11/2006 | Ramachandran |
| 7,152,045 B2 | 12/2006 | Hoffman |
| 7,165,727 B2 | 1/2007 | de Jong |
| 7,175,076 B1 | 2/2007 | Block et al. |
| 7,202,773 B1 | 4/2007 | Oba et al. |
| 7,206,806 B2 | 4/2007 | Pineau |
| 7,232,073 B1 | 6/2007 | de Jong |
| 7,246,752 B2 | 7/2007 | Brown |
| 7,254,569 B2 | 8/2007 | Goodman et al. |
| 7,263,507 B1 | 8/2007 | Brake, Jr. et al. |
| 7,270,276 B2 | 9/2007 | Vayssiere |
| 7,278,025 B2 | 10/2007 | Saito et al. |
| 7,287,692 B1 | 10/2007 | Patel et al. |
| 7,290,709 B2 | 11/2007 | Tsai et al. |
| 7,306,143 B2 | 12/2007 | Bonneau, Jr. et al. |
| 7,319,986 B2 | 1/2008 | Praisner et al. |
| 7,325,132 B2 | 1/2008 | Takayama et al. |
| 7,373,515 B2 | 5/2008 | Owen et al. |
| 7,374,099 B2 | 5/2008 | de Jong |
| 7,375,616 B2 | 5/2008 | Rowse et al. |
| 7,380,710 B2 | 6/2008 | Brown |
| 7,424,977 B2 | 9/2008 | Smets et al. |
| 7,453,439 B1 | 11/2008 | Kushler et al. |
| 7,472,829 B2 | 1/2009 | Brown |
| 7,487,357 B2 | 2/2009 | Smith et al. |
| 7,568,631 B2 | 8/2009 | Gibbs et al. |
| 7,584,153 B2 | 9/2009 | Brown et al. |
| 7,597,250 B2 | 10/2009 | Finn |
| 7,628,322 B2 | 12/2009 | Holtmanns et al. |
| 7,652,578 B2 | 1/2010 | Braun et al. |
| 7,689,832 B2 | 3/2010 | Talmor et al. |
| 7,703,142 B1 | 4/2010 | Wilson et al. |
| 7,748,609 B2 | 7/2010 | Sachdeva et al. |
| 7,748,617 B2 | 7/2010 | Gray |
| 7,748,636 B2 | 7/2010 | Finn |
| 7,762,457 B2 | 7/2010 | Bonalle et al. |
| 7,789,302 B2 | 9/2010 | Tame |
| 7,793,851 B2 | 9/2010 | Mullen |
| 7,796,013 B2 | 9/2010 | Murakami et al. |
| 7,801,799 B1 | 9/2010 | Brake, Jr. et al. |
| 7,801,829 B2 | 9/2010 | Gray et al. |
| 7,805,755 B2 | 9/2010 | Brown et al. |
| 7,809,643 B2 | 10/2010 | Phillips et al. |
| 7,827,115 B2 | 11/2010 | Weller et al. |
| 7,828,214 B2 | 11/2010 | Narendra et al. |
| 7,848,746 B2 | 12/2010 | Juels |
| 7,882,553 B2 | 2/2011 | Tuliani |
| 7,900,048 B2 | 3/2011 | Andersson |
| 7,908,216 B1 | 3/2011 | Davis et al. |
| 7,922,082 B2 | 4/2011 | Muscato |
| 7,933,589 B1 | 4/2011 | Mamdani et al. |
| 7,949,559 B2 | 5/2011 | Freiberg |
| 7,954,716 B2 | 6/2011 | Narendra et al. |
| 7,954,723 B2 | 6/2011 | Charrat |
| 7,962,369 B2 | 6/2011 | Rosenberg |
| 7,993,197 B2 | 8/2011 | Kaminkow |
| 8,005,426 B2 | 8/2011 | Huomo et al. |
| 8,010,405 B1 | 8/2011 | Bortolin et al. |
| RE42,762 E | 9/2011 | Shin et al. |
| 8,041,954 B2 | 10/2011 | Plesman |
| 8,060,012 B2 | 11/2011 | Sklovsky et al. |
| 8,074,877 B2 | 12/2011 | Mullen et al. |
| 8,082,450 B2 | 12/2011 | Frey et al. |
| 8,095,113 B2 | 1/2012 | Kean et al. |
| 8,099,332 B2 | 1/2012 | Lemay et al. |
| 8,103,249 B2 | 1/2012 | Markison |
| 8,108,687 B2 | 1/2012 | Ellis et al. |
| 8,127,143 B2 | 2/2012 | Abdallah et al. |
| 8,135,648 B2 | 3/2012 | Oram et al. |
| 8,140,010 B2 | 3/2012 | Symons et al. |
| 8,141,136 B2 | 3/2012 | Lee et al. |
| 8,150,321 B2 | 4/2012 | Winter et al. |
| 8,150,767 B2 | 4/2012 | Wankmueller |
| 8,186,602 B2 | 5/2012 | Itay et al. |
| 8,196,131 B1 | 6/2012 | von Behren et al. |
| 8,215,563 B2 | 7/2012 | Levy et al. |
| 8,224,753 B2 | 7/2012 | Atef et al. |
| 8,232,879 B2 | 7/2012 | Davis |
| 8,233,841 B2 | 7/2012 | Griffin et al. |
| 8,245,292 B2 | 8/2012 | Buer |
| 8,249,654 B1 | 8/2012 | Zhu |
| 8,266,451 B2 | 9/2012 | Leydier et al. |
| 8,285,329 B1 | 10/2012 | Zhu |
| 8,302,872 B2 | 11/2012 | Mullen |
| 8,312,519 B1 | 11/2012 | Bailey et al. |
| 8,316,237 B1 | 11/2012 | Felsher et al. |
| 8,332,272 B2 | 12/2012 | Fisher |
| 8,365,988 B1 | 2/2013 | Medina, III et al. |
| 8,369,960 B2 | 2/2013 | Tran et al. |
| 8,371,501 B1 | 2/2013 | Hopkins |
| 8,381,307 B2 | 2/2013 | Cimino |
| 8,391,719 B2 | 3/2013 | Alameh et al. |
| 8,417,231 B2 | 4/2013 | Sanding et al. |
| 8,439,271 B2 | 5/2013 | Smets et al. |
| 8,475,367 B1 | 7/2013 | Yuen et al. |
| 8,489,112 B2 | 7/2013 | Roeding et al. |
| 8,511,542 B2 | 8/2013 | Pan |
| 8,559,872 B2 | 10/2013 | Butler |
| 8,566,916 B1 | 10/2013 | Bailey et al. |
| 8,567,670 B2 | 10/2013 | Stanfield et al. |
| 8,572,386 B2 | 10/2013 | Takekawa et al. |
| 8,577,810 B1 | 11/2013 | Dalit et al. |
| 8,583,454 B2 | 11/2013 | Beraja et al. |

(56) References Cited

U.S. PATENT DOCUMENTS

| | | | |
|---|---|---|---|
| 8,589,335 B2 | 11/2013 | Smith et al. | |
| 8,594,730 B2 | 11/2013 | Bona et al. | |
| 8,615,468 B2 | 12/2013 | Varadarajan | |
| 8,620,218 B2 | 12/2013 | Awad | |
| 8,667,285 B2 | 3/2014 | Coulier et al. | |
| 8,723,941 B1 | 5/2014 | Shirbabadi et al. | |
| 8,726,405 B1 | 5/2014 | Bailey et al. | |
| 8,740,073 B2 | 6/2014 | Vijayshankar et al. | |
| 8,752,189 B2 | 6/2014 | de Jong | |
| 8,794,509 B2 | 8/2014 | Bishop et al. | |
| 8,799,668 B2 | 8/2014 | Cheng | |
| 8,806,592 B2 | 8/2014 | Ganesan | |
| 8,807,440 B1 | 8/2014 | von Behren et al. | |
| 8,811,892 B2 | 8/2014 | Khan et al. | |
| 8,814,039 B2 | 8/2014 | Bishop et al. | |
| 8,814,052 B2 | 8/2014 | Bona et al. | |
| 8,818,867 B2 | 8/2014 | Baldwin et al. | |
| 8,850,538 B1 | 9/2014 | Vernon et al. | |
| 8,861,733 B2 | 10/2014 | Benteo et al. | |
| 8,880,027 B1 | 11/2014 | Darringer | |
| 8,888,002 B2 | 11/2014 | Marshall Chesney et al. | |
| 8,898,088 B2 | 11/2014 | Springer et al. | |
| 8,934,837 B2 | 1/2015 | Zhu et al. | |
| 8,977,569 B2 | 3/2015 | Rao | |
| 8,994,498 B2 | 3/2015 | Agrafioti et al. | |
| 9,004,365 B2 | 4/2015 | Bona et al. | |
| 9,038,894 B2 | 5/2015 | Khalid | |
| 9,042,814 B2 | 5/2015 | Royston et al. | |
| 9,047,531 B2 | 6/2015 | Showering et al. | |
| 9,069,976 B2 | 6/2015 | Toole et al. | |
| 9,081,948 B2 | 7/2015 | Magne | |
| 9,104,853 B2 | 8/2015 | Venkataramani et al. | |
| 9,118,663 B1 | 8/2015 | Bailey et al. | |
| 9,122,964 B2 | 9/2015 | Krawczewicz | |
| 9,129,280 B2 | 9/2015 | Bona et al. | |
| 9,152,832 B2 | 10/2015 | Royston et al. | |
| 9,203,800 B2 | 12/2015 | Izu et al. | |
| 9,209,867 B2 | 12/2015 | Royston | |
| 9,251,330 B2 | 2/2016 | Boivie et al. | |
| 9,251,518 B2 | 2/2016 | Levin et al. | |
| 9,258,715 B2 | 2/2016 | Borghei | |
| 9,270,337 B2 | 2/2016 | Zhu et al. | |
| 9,306,626 B2 | 4/2016 | Hall et al. | |
| 9,306,942 B1 | 4/2016 | Bailey et al. | |
| 9,324,066 B2 | 4/2016 | Archer et al. | |
| 9,324,067 B2 | 4/2016 | Van Os et al. | |
| 9,332,587 B2 | 5/2016 | Salahshoor | |
| 9,338,622 B2 | 5/2016 | Bjontegard | |
| 9,373,141 B1 | 6/2016 | Shakkarwar | |
| 9,379,841 B2 | 6/2016 | Fine et al. | |
| 9,413,430 B2 | 8/2016 | Royston et al. | |
| 9,413,768 B1 | 8/2016 | Gregg et al. | |
| 9,420,496 B1 | 8/2016 | Indurkar | |
| 9,426,132 B1 | 8/2016 | Alikhani | |
| 9,432,339 B1 | 8/2016 | Bowness | |
| 9,455,968 B1 | 9/2016 | Machani et al. | |
| 9,473,509 B2 | 10/2016 | Arsanjani et al. | |
| 9,491,626 B2 | 11/2016 | Sharma et al. | |
| 9,553,637 B2 | 1/2017 | Yang et al. | |
| 9,619,952 B1 | 4/2017 | Zhao et al. | |
| 9,635,000 B1 | 4/2017 | Muftic | |
| 9,665,858 B1 | 5/2017 | Kumar | |
| 9,674,705 B2 | 6/2017 | Rose et al. | |
| 9,679,286 B2 | 6/2017 | Colnot et al. | |
| 9,680,942 B2 | 6/2017 | Dimmick | |
| 9,710,804 B2 | 7/2017 | Zhou et al. | |
| 9,740,342 B2 | 8/2017 | Paulsen et al. | |
| 9,740,988 B1 | 8/2017 | Levin et al. | |
| 9,763,097 B2 | 9/2017 | Robinson et al. | |
| 9,767,329 B2 | 9/2017 | Forster | |
| 9,769,662 B1 | 9/2017 | Queru | |
| 9,773,151 B2 | 9/2017 | Mil'shtein et al. | |
| 9,780,953 B2 | 10/2017 | Gaddam et al. | |
| 9,891,823 B2 | 2/2018 | Feng et al. | |
| 9,940,571 B1 | 4/2018 | Herrington | |
| 9,953,323 B2 | 4/2018 | Candelore et al. | |
| 9,961,194 B1 | 5/2018 | Wiechman et al. | |
| 9,965,756 B2 | 5/2018 | Davis et al. | |
| 9,965,911 B2 | 5/2018 | Wishne | |
| 9,978,058 B2 | 5/2018 | Wurmfeld et al. | |
| 10,043,164 B2 | 8/2018 | Dogin et al. | |
| 10,075,437 B1 | 9/2018 | Costigan et al. | |
| 10,129,648 B1 | 11/2018 | Hernandez et al. | |
| 10,133,979 B1 | 11/2018 | Eidam et al. | |
| 10,217,105 B1 | 2/2019 | Sangi et al. | |
| 10,438,437 B1 | 10/2019 | Herrington et al. | |
| 11,138,593 B1 * | 10/2021 | Ho | G06Q 20/382 |
| 2001/0010723 A1 | 8/2001 | Pinkas | |
| 2001/0029485 A1 | 10/2001 | Brody et al. | |
| 2001/0034702 A1 | 10/2001 | Mockett et al. | |
| 2001/0054003 A1 | 12/2001 | Chien et al. | |
| 2002/0078345 A1 | 6/2002 | Sandhu et al. | |
| 2002/0093530 A1 | 7/2002 | Krothapalli et al. | |
| 2002/0100808 A1 | 8/2002 | Norwood et al. | |
| 2002/0120583 A1 | 8/2002 | Keresman, III et al. | |
| 2002/0152116 A1 | 10/2002 | Yan et al. | |
| 2002/0153424 A1 | 10/2002 | Li | |
| 2002/0165827 A1 | 11/2002 | Gien et al. | |
| 2002/0199103 A1 * | 12/2002 | Dube | H04L 9/3234 |
| | | | 713/168 |
| 2003/0023554 A1 | 1/2003 | Yap et al. | |
| 2003/0034873 A1 | 2/2003 | Chase et al. | |
| 2003/0055727 A1 | 3/2003 | Walker et al. | |
| 2003/0078882 A1 | 4/2003 | Sukeda et al. | |
| 2003/0167350 A1 | 9/2003 | Davis et al. | |
| 2003/0208449 A1 | 11/2003 | Diao | |
| 2004/0015958 A1 | 1/2004 | Veil et al. | |
| 2004/0039919 A1 | 2/2004 | Takayama et al. | |
| 2004/0127256 A1 | 7/2004 | Goldthwaite et al. | |
| 2004/0215674 A1 | 10/2004 | Odinak et al. | |
| 2004/0230799 A1 | 11/2004 | Davis | |
| 2005/0044367 A1 | 2/2005 | Gasparini et al. | |
| 2005/0075985 A1 | 4/2005 | Cartmell | |
| 2005/0081038 A1 | 4/2005 | Arditti Modiano et al. | |
| 2005/0138387 A1 | 6/2005 | Lam et al. | |
| 2005/0156026 A1 | 7/2005 | Ghosh et al. | |
| 2005/0160049 A1 | 7/2005 | Lundholm | |
| 2005/0195975 A1 | 9/2005 | Kawakita | |
| 2005/0247797 A1 | 11/2005 | Ramachandran | |
| 2006/0006230 A1 | 1/2006 | Bear et al. | |
| 2006/0040726 A1 | 2/2006 | Szrek et al. | |
| 2006/0041402 A1 | 2/2006 | Baker | |
| 2006/0044153 A1 | 3/2006 | Dawidowsky | |
| 2006/0047954 A1 | 3/2006 | Sachdeva et al. | |
| 2006/0085848 A1 | 4/2006 | Aissi et al. | |
| 2006/0136334 A1 | 6/2006 | Atkinson et al. | |
| 2006/0173985 A1 | 8/2006 | Moore | |
| 2006/0174331 A1 | 8/2006 | Schuetz | |
| 2006/0242698 A1 | 10/2006 | Inskeep et al. | |
| 2006/0280338 A1 | 12/2006 | Rabb | |
| 2007/0033642 A1 | 2/2007 | Ganesan et al. | |
| 2007/0055630 A1 | 3/2007 | Gauthier et al. | |
| 2007/0061266 A1 | 3/2007 | Moore et al. | |
| 2007/0061487 A1 | 3/2007 | Moore et al. | |
| 2007/0116292 A1 | 5/2007 | Kurita et al. | |
| 2007/0118483 A1 * | 5/2007 | Hill | G06Q 20/40 |
| | | | 705/64 |
| 2007/0118745 A1 | 5/2007 | Buer | |
| 2007/0197261 A1 | 8/2007 | Humbel | |
| 2007/0224969 A1 | 9/2007 | Rao | |
| 2007/0241182 A1 | 10/2007 | Buer | |
| 2007/0256134 A1 | 11/2007 | Lehtonen et al. | |
| 2007/0258594 A1 | 11/2007 | Sandhu et al. | |
| 2007/0278291 A1 | 12/2007 | Rans et al. | |
| 2008/0008315 A1 | 1/2008 | Fontana et al. | |
| 2008/0011831 A1 | 1/2008 | Bonalle et al. | |
| 2008/0014867 A1 | 1/2008 | Finn | |
| 2008/0035738 A1 | 2/2008 | Mullen | |
| 2008/0071681 A1 | 3/2008 | Khalid | |
| 2008/0072303 A1 | 3/2008 | Syed | |
| 2008/0086767 A1 | 4/2008 | Kulkarni et al. | |
| 2008/0103968 A1 | 5/2008 | Bies et al. | |
| 2008/0109309 A1 | 5/2008 | Landau et al. | |
| 2008/0110983 A1 | 5/2008 | Ashfield | |

(56) References Cited

U.S. PATENT DOCUMENTS

| | | |
|---|---|---|
| 2008/0120711 A1 | 5/2008 | Dispensa |
| 2008/0156873 A1 | 7/2008 | Wilhelm et al. |
| 2008/0162312 A1 | 7/2008 | Sklovsky et al. |
| 2008/0164308 A1 | 7/2008 | Aaron et al. |
| 2008/0207307 A1 | 8/2008 | Cunningham, II et al. |
| 2008/0209543 A1 | 8/2008 | Aaron |
| 2008/0223918 A1 | 9/2008 | Williams et al. |
| 2008/0285746 A1 | 11/2008 | Landrock et al. |
| 2008/0308641 A1 | 12/2008 | Finn |
| 2009/0037275 A1 | 2/2009 | Pollio |
| 2009/0048026 A1 | 2/2009 | French |
| 2009/0132417 A1 | 5/2009 | Scipioni et al. |
| 2009/0143104 A1 | 6/2009 | Loh et al. |
| 2009/0171682 A1 | 7/2009 | Dixon et al. |
| 2009/0210308 A1 | 8/2009 | Toomer et al. |
| 2009/0235339 A1 | 9/2009 | Mennes et al. |
| 2009/0249077 A1 | 10/2009 | Gargaro et al. |
| 2009/0282264 A1 | 11/2009 | Ameil et al. |
| 2010/0023449 A1 | 1/2010 | Skowronek et al. |
| 2010/0023455 A1 | 1/2010 | Dispensa et al. |
| 2010/0029202 A1 | 2/2010 | Jolivet et al. |
| 2010/0033310 A1 | 2/2010 | Narendra et al. |
| 2010/0036769 A1 | 2/2010 | Winters et al. |
| 2010/0078471 A1 | 4/2010 | Lin et al. |
| 2010/0082491 A1 | 4/2010 | Rosenblatt et al. |
| 2010/0094754 A1 | 4/2010 | Bertran et al. |
| 2010/0095130 A1 | 4/2010 | Bertran et al. |
| 2010/0100480 A1 | 4/2010 | Altman et al. |
| 2010/0114731 A1 | 5/2010 | Kingston et al. |
| 2010/0192230 A1 | 7/2010 | Steeves et al. |
| 2010/0207742 A1 | 8/2010 | Buhot et al. |
| 2010/0211797 A1 | 8/2010 | Westerveld et al. |
| 2010/0240413 A1 | 9/2010 | He et al. |
| 2010/0257357 A1 | 10/2010 | McClain |
| 2010/0312634 A1 | 12/2010 | Cervenka |
| 2010/0312635 A1 | 12/2010 | Cervenka |
| 2011/0028160 A1 | 2/2011 | Reeding et al. |
| 2011/0035604 A1 | 2/2011 | Habraken |
| 2011/0060631 A1 | 3/2011 | Grossman et al. |
| 2011/0068170 A1 | 3/2011 | Lehman |
| 2011/0084132 A1 | 4/2011 | Tofighbakhsh |
| 2011/0101093 A1 | 5/2011 | Ehrensvard |
| 2011/0113245 A1 | 5/2011 | Varadarajan |
| 2011/0125638 A1 | 5/2011 | Davis et al. |
| 2011/0131415 A1 | 6/2011 | Schneider |
| 2011/0153437 A1 | 6/2011 | Archer et al. |
| 2011/0153496 A1 | 6/2011 | Royyuru |
| 2011/0208658 A1 | 8/2011 | Makhotin |
| 2011/0208965 A1 | 8/2011 | Machani |
| 2011/0211219 A1 | 9/2011 | Bradley et al. |
| 2011/0218911 A1 | 9/2011 | Spodak |
| 2011/0238564 A1 | 9/2011 | Lim et al. |
| 2011/0246780 A1 | 10/2011 | Yeap et al. |
| 2011/0258452 A1 | 10/2011 | Coulier et al. |
| 2011/0280406 A1 | 11/2011 | Ma et al. |
| 2011/0282785 A1 | 11/2011 | Chin |
| 2011/0294418 A1 | 12/2011 | Chen |
| 2011/0312271 A1 | 12/2011 | Ma et al. |
| 2012/0024947 A1 | 2/2012 | Naelon |
| 2012/0030047 A1 | 2/2012 | Fuentes et al. |
| 2012/0030121 A1 | 2/2012 | Grellier |
| 2012/0039469 A1* | 2/2012 | Mueller ............... G06Q 20/12 380/252 |
| 2012/0047071 A1 | 2/2012 | Mullen et al. |
| 2012/0079281 A1 | 3/2012 | Lowenstein et al. |
| 2012/0109735 A1 | 5/2012 | Krawczewicz et al. |
| 2012/0109764 A1 | 5/2012 | Martin et al. |
| 2012/0143754 A1 | 6/2012 | Patel |
| 2012/0150737 A1 | 6/2012 | Rottink et al. |
| 2012/0178366 A1 | 7/2012 | Levy et al. |
| 2012/0196583 A1 | 8/2012 | Kindo |
| 2012/0207305 A1 | 8/2012 | Gallo et al. |
| 2012/0209773 A1 | 8/2012 | Ranganathan |
| 2012/0238206 A1 | 9/2012 | Singh et al. |
| 2012/0239560 A1 | 9/2012 | Pourfallah et al. |
| 2012/0252350 A1 | 10/2012 | Steinmetz et al. |
| 2012/0254394 A1 | 10/2012 | Barras |
| 2012/0284194 A1 | 11/2012 | Liu et al. |
| 2012/0290472 A1 | 11/2012 | Mullen et al. |
| 2012/0296818 A1 | 11/2012 | Nuzzi et al. |
| 2012/0316992 A1 | 12/2012 | Oborne |
| 2012/0317035 A1 | 12/2012 | Royyuru et al. |
| 2012/0317628 A1 | 12/2012 | Yeager |
| 2013/0005245 A1 | 1/2013 | Royston |
| 2013/0008956 A1 | 1/2013 | Ashfield |
| 2013/0026229 A1 | 1/2013 | Jarman et al. |
| 2013/0048713 A1 | 2/2013 | Pan |
| 2013/0054474 A1 | 2/2013 | Yeager |
| 2013/0065564 A1 | 3/2013 | Conner et al. |
| 2013/0080228 A1 | 3/2013 | Fisher |
| 2013/0080229 A1 | 3/2013 | Fisher |
| 2013/0099587 A1 | 4/2013 | Lou et al. |
| 2013/0104251 A1 | 4/2013 | Moore et al. |
| 2013/0106576 A1 | 5/2013 | Hinman et al. |
| 2013/0119130 A1 | 5/2013 | Breams |
| 2013/0130614 A1 | 5/2013 | Busch-Sorensen |
| 2013/0144793 A1 | 6/2013 | Royston |
| 2013/0171929 A1 | 7/2013 | Adams et al. |
| 2013/0179351 A1 | 7/2013 | Wallner |
| 2013/0185772 A1 | 7/2013 | Jaudon et al. |
| 2013/0191279 A1 | 7/2013 | Calman et al. |
| 2013/0200999 A1 | 8/2013 | Spodak et al. |
| 2013/0216108 A1 | 8/2013 | Hwang et al. |
| 2013/0226791 A1 | 8/2013 | Springer et al. |
| 2013/0226796 A1 | 8/2013 | Jiang et al. |
| 2013/0232082 A1 | 9/2013 | Krawczewicz et al. |
| 2013/0238894 A1 | 9/2013 | Ferg et al. |
| 2013/0282360 A1 | 10/2013 | Shimota et al. |
| 2013/0303085 A1 | 11/2013 | Boucher et al. |
| 2013/0304651 A1 | 11/2013 | Smith |
| 2013/0312082 A1 | 11/2013 | Izu et al. |
| 2013/0314593 A1 | 11/2013 | Reznik et al. |
| 2013/0344857 A1 | 12/2013 | Berionne et al. |
| 2014/0002238 A1 | 1/2014 | Taveau et al. |
| 2014/0019352 A1 | 1/2014 | Shrivastava |
| 2014/0027506 A1 | 1/2014 | Heo et al. |
| 2014/0032409 A1 | 1/2014 | Rosano |
| 2014/0032410 A1 | 1/2014 | Georgiev et al. |
| 2014/0040120 A1 | 2/2014 | Cho et al. |
| 2014/0040139 A1 | 2/2014 | Brudnicki et al. |
| 2014/0040147 A1 | 2/2014 | Varadarakan et al. |
| 2014/0047235 A1 | 2/2014 | Lessiak et al. |
| 2014/0067690 A1 | 3/2014 | Pitroda et al. |
| 2014/0074637 A1 | 3/2014 | Hammad |
| 2014/0074655 A1 | 3/2014 | Lim et al. |
| 2014/0081720 A1 | 3/2014 | Wu |
| 2014/0138435 A1 | 5/2014 | Khalid |
| 2014/0171034 A1 | 6/2014 | Aleksin et al. |
| 2014/0171039 A1 | 6/2014 | Bjontegard |
| 2014/0172700 A1 | 6/2014 | Teuwen et al. |
| 2014/0180851 A1 | 6/2014 | Fisher |
| 2014/0208112 A1 | 7/2014 | McDonald et al. |
| 2014/0214674 A1 | 7/2014 | Narula |
| 2014/0229375 A1 | 8/2014 | Zaytzsev et al. |
| 2014/0245391 A1 | 8/2014 | Adenuga |
| 2014/0256251 A1 | 9/2014 | Caceres et al. |
| 2014/0258099 A1 | 9/2014 | Rosano |
| 2014/0258113 A1 | 9/2014 | Gauthier et al. |
| 2014/0258125 A1 | 9/2014 | Gerber et al. |
| 2014/0274179 A1 | 9/2014 | Zhu et al. |
| 2014/0279479 A1 | 9/2014 | Maniar et al. |
| 2014/0337175 A1* | 11/2014 | Katzin ............... G06Q 20/326 705/26.62 |
| 2014/0337235 A1 | 11/2014 | Van Heerden et al. |
| 2014/0339315 A1 | 11/2014 | Ko |
| 2014/0346860 A1 | 11/2014 | Aubry et al. |
| 2014/0365780 A1 | 12/2014 | Movassaghi |
| 2014/0379361 A1 | 12/2014 | Mahadkar et al. |
| 2015/0012444 A1 | 1/2015 | Brown et al. |
| 2015/0019442 A1* | 1/2015 | Hird ............... H04W 12/041 726/30 |
| 2015/0032635 A1 | 1/2015 | Guise |
| 2015/0071486 A1 | 3/2015 | Rhoads et al. |

(56) References Cited

U.S. PATENT DOCUMENTS

| | | |
|---|---|---|
| 2015/0073995 A1* | 3/2015 | Hayhow ............ G06Q 20/3821 705/71 |
| 2015/0088757 A1 | 3/2015 | Zhou et al. |
| 2015/0089586 A1 | 3/2015 | Ballesteros |
| 2015/0134452 A1 | 5/2015 | Williams |
| 2015/0140960 A1 | 5/2015 | Powell et al. |
| 2015/0154595 A1 | 6/2015 | Collinge et al. |
| 2015/0170137 A1* | 6/2015 | Balbus ............... G06Q 20/3221 705/41 |
| 2015/0170138 A1 | 6/2015 | Rao |
| 2015/0178724 A1 | 6/2015 | Ngo et al. |
| 2015/0186871 A1 | 7/2015 | Laracey |
| 2015/0205379 A1 | 7/2015 | Mag et al. |
| 2015/0302409 A1 | 10/2015 | Malek et al. |
| 2015/0317626 A1 | 11/2015 | Ran et al. |
| 2015/0332266 A1 | 11/2015 | Friedlander et al. |
| 2015/0339474 A1 | 11/2015 | Paz et al. |
| 2015/0371234 A1 | 12/2015 | Huang et al. |
| 2016/0012465 A1 | 1/2016 | Sharp |
| 2016/0026997 A1 | 1/2016 | Tsui et al. |
| 2016/0048913 A1 | 2/2016 | Rausaria et al. |
| 2016/0055480 A1 | 2/2016 | Shah |
| 2016/0057619 A1 | 2/2016 | Lopez |
| 2016/0065370 A1 | 3/2016 | Le Saint et al. |
| 2016/0087957 A1 | 3/2016 | Shah et al. |
| 2016/0092696 A1 | 3/2016 | Guglani et al. |
| 2016/0148193 A1 | 5/2016 | Kelley et al. |
| 2016/0232523 A1 | 8/2016 | Venot et al. |
| 2016/0239672 A1 | 8/2016 | Khan et al. |
| 2016/0253651 A1 | 9/2016 | Park et al. |
| 2016/0255072 A1 | 9/2016 | Liu |
| 2016/0267486 A1 | 9/2016 | Mitra et al. |
| 2016/0277383 A1 | 9/2016 | Guyomarc'h et al. |
| 2016/0277388 A1 | 9/2016 | Lowe et al. |
| 2016/0307187 A1 | 10/2016 | Guo et al. |
| 2016/0307189 A1 | 10/2016 | Zarakas et al. |
| 2016/0307190 A1* | 10/2016 | Zarakas ............... G06Q 20/352 |
| 2016/0314472 A1 | 10/2016 | Ashfield |
| 2016/0330027 A1 | 11/2016 | Ebrahimi |
| 2016/0335531 A1 | 11/2016 | Mullen et al. |
| 2016/0379217 A1 | 12/2016 | Hammad |
| 2017/0004502 A1 | 1/2017 | Quentin et al. |
| 2017/0011395 A1 | 1/2017 | Pillai et al. |
| 2017/0011406 A1 | 1/2017 | Tunnell et al. |
| 2017/0017957 A1 | 1/2017 | Radu |
| 2017/0017964 A1 | 1/2017 | Janefalkar et al. |
| 2017/0024716 A1 | 1/2017 | Jiam et al. |
| 2017/0039566 A1 | 2/2017 | Schipperheijn |
| 2017/0041759 A1 | 2/2017 | Gantert et al. |
| 2017/0068950 A1 | 3/2017 | Kwon |
| 2017/0103388 A1 | 4/2017 | Pillai et al. |
| 2017/0104739 A1 | 4/2017 | Lansler et al. |
| 2017/0109509 A1 | 4/2017 | Baghdasaryan |
| 2017/0109730 A1 | 4/2017 | Locke et al. |
| 2017/0116447 A1 | 4/2017 | Cimino et al. |
| 2017/0124568 A1 | 5/2017 | Moghadam |
| 2017/0140379 A1 | 5/2017 | Deck |
| 2017/0154328 A1 | 6/2017 | Zarakas et al. |
| 2017/0154333 A1 | 6/2017 | Gleeson et al. |
| 2017/0180134 A1 | 6/2017 | King |
| 2017/0230189 A1 | 8/2017 | Toll et al. |
| 2017/0237301 A1 | 8/2017 | Elad et al. |
| 2017/0289127 A1 | 10/2017 | Hendrick |
| 2017/0295013 A1 | 10/2017 | Claes |
| 2017/0316696 A1 | 11/2017 | Bartel |
| 2017/0317834 A1 | 11/2017 | Smith et al. |
| 2017/0330173 A1 | 11/2017 | Woo et al. |
| 2017/0374070 A1 | 12/2017 | Shah et al. |
| 2018/0034507 A1 | 2/2018 | Wobak et al. |
| 2018/0039986 A1 | 2/2018 | Essebag et al. |
| 2018/0068316 A1 | 3/2018 | Essebag et al. |
| 2018/0129945 A1 | 5/2018 | Saxena et al. |
| 2018/0158132 A1* | 6/2018 | Salvatore ........... G06Q 30/0633 |
| 2018/0160255 A1 | 6/2018 | Park |
| 2018/0191501 A1 | 7/2018 | Lindemann |
| 2018/0205712 A1 | 7/2018 | Versteeg et al. |
| 2018/0240106 A1 | 8/2018 | Garrett et al. |
| 2018/0254909 A1 | 9/2018 | Hancock |
| 2018/0268132 A1 | 9/2018 | Buer et al. |
| 2018/0270214 A1 | 9/2018 | Caterino et al. |
| 2018/0294959 A1 | 10/2018 | Traynor et al. |
| 2018/0300716 A1 | 10/2018 | Carlson |
| 2018/0302396 A1 | 10/2018 | Camenisch et al. |
| 2018/0315050 A1 | 11/2018 | Hammad |
| 2018/0316666 A1 | 11/2018 | Koved et al. |
| 2018/0322486 A1 | 11/2018 | Deliwala et al. |
| 2018/0359100 A1 | 12/2018 | Gaddam et al. |
| 2019/0014107 A1 | 1/2019 | George |
| 2019/0019375 A1 | 1/2019 | Foley |
| 2019/0036678 A1 | 1/2019 | Ahmed |
| 2019/0122214 A1* | 4/2019 | Chau .................. G06Q 20/3278 |
| 2019/0238517 A1 | 8/2019 | D'Agostino et al. |
| 2019/0333139 A1* | 10/2019 | Royyuru ................ G06Q 20/04 |
| 2020/0104833 A1 | 4/2020 | Rule et al. |
| 2020/0104841 A1 | 4/2020 | Osborn et al. |
| 2021/0182833 A1* | 6/2021 | Singh ................... G06K 19/073 |

FOREIGN PATENT DOCUMENTS

| | | |
|---|---|---|
| CN | 103023643 A | 4/2013 |
| CN | 103417202 A | 12/2013 |
| EP | 1085424 A1 | 3/2001 |
| EP | 1223565 A1 | 7/2002 |
| EP | 1265186 A2 | 12/2002 |
| EP | 1783919 A1 | 5/2007 |
| EP | 2139196 A1 | 12/2009 |
| EP | 1469419 A1 | 8/2012 |
| EP | 2852070 A1 | 3/2015 |
| GB | 2457221 A | 8/2009 |
| GB | 2516861 A | 2/2015 |
| GB | 2551907 A | 1/2018 |
| KR | 101508320 B1 | 4/2015 |
| WO | 0049586 A1 | 8/2000 |
| WO | 2006070189 A2 | 7/2006 |
| WO | 2008055170 A2 | 5/2008 |
| WO | 2009025605 A2 | 2/2009 |
| WO | 2010049252 A1 | 5/2010 |
| WO | 2011112158 A1 | 9/2011 |
| WO | 2012001624 A1 | 1/2012 |
| WO | 2013039395 A1 | 3/2013 |
| WO | 2013155562 A1 | 10/2013 |
| WO | 2013192358 A2 | 12/2013 |
| WO | 2014043278 A1 | 3/2014 |
| WO | 2014170741 A2 | 10/2014 |
| WO | 2015179649 A1 | 11/2015 |
| WO | 2015183818 A1 | 12/2015 |
| WO | 2016097718 A1 | 6/2016 |
| WO | 2016160816 A1 | 10/2016 |
| WO | 2016168394 A1 | 10/2016 |
| WO | 2017042375 A1 | 3/2017 |
| WO | 2017042400 A1 | 3/2017 |
| WO | 2017157859 A1 | 9/2017 |
| WO | 2017208063 A1 | 12/2017 |
| WO | 2018063809 A1 | 4/2018 |
| WO | 2018137888 A1 | 8/2018 |

OTHER PUBLICATIONS

Di Ma et al., Location-Aware and Safer Cards: Enhancing RFID Security and Privacy via Location Sensing, Dec. 10, 2012, IEEE, pp. 57-69 (Year: 2012).*

Batina, L. and Poll, E., "SmartCards and RFID", Course PowerPoint Presentation for IPA Security Course, Digital Security at University of Nijmegen, Netherlands (date unknown) 75 pages.

Haykin, M. and Warnar, R., "Smart Card Technology: New Methods for Computer Access Control", Computer Science and Technology NIST Special Publication 500-157:1-60 (1988).

Lehpamer, H., "Component of the RFID System", RFID Design Principles, 2nd edition pp. 133-201 (2012).

Author Unknown, "CardrefreshersM from American Express®", [online] 2019 [retrieved on Mar. 25, 2019]. Retrieved from Internet

(56) References Cited

OTHER PUBLICATIONS

URL: https://merchant-channel.americanexpress.com/merchant/en_US/cardrefresher, 2 pages.
Author Unknown, "Add Account Updater to your recurring payment tool", [online] 2018-19 [retrieved on Mar. 25, 2019]. Retrieved from Internet URL: https://www.authorize.net/our-features/account-updater/, 5 pages.
Author Unknown, "Visa® Account Updater for Merchants", [online] 2019 [retrieved on Mar. 25, 2019], Retrieved from Internet URL: https://usa.visa.com/dam/VCOM/download/merchants/visa-account-updater-product-infomnation-fact-sheet-for-merchants.pdf, 2 pages.
Author Unknown, "Manage the cards that you use with Apple Pay", Apple Support [online] 2019 [retrieved on Mar. 25, 2019]. Retrieved from Internet URL: https://support.apple.com/en-us/HT205583, 5 pages.
Author Unknown, "Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/Bo0kB_Entry_Point_Specification_v2_6_20160809023257319.pdf, 52 pages.
Author Unknown, "EMV Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_V4.3_Book_2_Security_and_Key_Management_20120607061923900.pdf, 174 pages.
Author Unknown, "NFC Guide: All You Need to Know About Near Field Communication", Square Guide [online] 2018 [retrieved on Nov. 13, 2018] Retrieved from Internet URL: https://squareup.com/guides/nfc, 8 pages.
Profis, S., "Everything you need to know about NFC and mobile payments" CNET Directory [online], 2014 [retrieved on Mar. 25, 2019]. Retrieved from the Internet URL: https://www.cnet.com/how-to/how-nfc-works-and-mobile-payments/, 6 pages.
Cozma, N., "Copy data from other devices in Android 5.0 Lollipop setup", CNET Directory [online] 2014 [retrieved on Mar. 25, 2019]. Retrieved from the Internet URL: https://www.cnet.com/how-to/copy-data-from-other-devices-in-android-5-0-lollipop-setup/, 5 pages.
Kevin, Android Enthusiast, "How to copy text string from nfc tag", StackExchange [online] 2013 [retrieved on Mar. 25, 2019]. Retrieved from the Internet URL: https://android.stackexchange.com/questions/55689/how-to-copy-text-string-from-nfc-tag, 11 pages.
Author Unknown, "Tap & Go Device Setup", Samsung [online] date unknown [retrieved on Mar. 25, 2019], Retrieved from the Internet U Rl: https://www.samsung.com/us/switch-me/switch-to-the-galaxy-s-5/app/partial/setup-device/tap-go.html, 1 page.
Author Unknown, "Multiple encryption", Wikipedia [online] 2019 [retrieved on Mar. 25, 2019], Retrieved from Internet URL: https://en.wikipedia.org/wiki/Multiple_encryption, 4 pages.
Krawczyk, et al., "HMAC: Keyed-Hashing for Message Authentication", Network Working Group RFC:2104 memo [online] 1997 [retrieved on Mar. 25, 2019] Retrieved from Internet URL: https://tools.ietf.org/html/rfc2104, 12 pages.
Song, et al.," The AES-CMAC Algorithm", Network Working Group RFC: 4493 memo [online] 2006 [retrieved on Mar. 25, 2019]. Retrieved from Internet URL: https://tools.ietf.org/html/rfc4493, 21 pages.
Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.
Adams, D., and Maier, A-K., "Goldbug Big Seven open source crypto-messengers to be compared - or: Comprehensive Confidentiality Review & Audit of GoldBug Encrypting E-Mail-Client & Secure Instant Messenger", Big Seven Study 2016 [online] [retrieved on Mar. 25, 2018]. Retrieved from Internet URL: https://sf.net/projects/goldbug/files/bigseven-crypto-audit.pdf, 309 pages.
Author Unknown, "Triple DES", Wikipedia [online] 2018 [retrieved on Mar. 25, 2019]. Retrieved from Internet URL: https://simple.wikipedia.org/wiki/Triple_DES, 2 pages.
Song F., and Yun, A.I., "Quantum Security of NMAC and Related Constructions—PRF domain extension against quantum attacks", IACR Cryptology ePrint Archive [online] 2017 [retrieved on Mar. 25, 2019]. Retrieved from Internet URL: https://eprint.iacr.org/2017/509.pdf, 41 pages.
Saxena, N., "Lecture 10: NMAC, HMAC and Number Theory", CS 6903 Modern Cryptography [online] 2008 [retrieved an Mar. 25, 2019]. Retrieved from Internet URL: http://isis.poly.edu/courses/cs6903/Lectures/lecture10.pdf, 8 pages.
Berg, G., "Fundamentals of EMV", Smart Card Alliance [online] date unknown [retrieved on Mar. 27, 2019]. Retrieveed from Internet URL: https://www.securetechalliance.org/resources/media/scap13_preconference/02.pdf, 37 pages.
Pierce, K., "Is the amazon echo nfc compatible?", Amazon.com Customer Q&A [online] 2016 [retrieved on Mar. 26, 2019]. Retrieved from Internet URL: https://www.amazon.com/ask/questions/Tx1RJXYSPE6XLJD2_encodi . . . , 2 pages.
Author Unknown, "Multi-Factor Authentication", idaptive [online] 2019 [retrieved on Mar. 25, 2019]. Retrieved from Internet URL: https://www.centrify.com/products/application-services/adaptive-multi-factor-authentication/risk-based-mfa/, 10 pages.
Author Unknown, "Adaptive Authentication", SecureAuth [online] 2019 [retrieved on Mar. 25, 2019}. Retrieved from Internet URL: https://www.secureauth.com/products/access-management/adaptive-authentication, 7 pages.
van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.
Author Unknown, "Autofill", Computer Hope [online] 2018 [retrieved on Mar. 25, 2019]. Retrieved from Internet URL: https://www.computerhope.com/jargon/a/autofilLhtm, 2 pages.
Author Unknown, "Fill out forms automatically", Google Chrome Help [online] 2019 [retrieved on Mar. 25, 2019]. Retrieved from Internet URL: https://support.google.com/chrome/answer/142893?co=GENIE.Platform%3DDesktop&hl=en, 3 pages.
Author Unknown, "Autofill credit cards, contacts, and passwords in Safari on Mac", Apple Safari User Guide [online] 2019 [retrieved on Mar. 25, 2019]. Retrieved from Internet URL: https://support.apple.com/guide/safari/use-autofill-brw1103/mac, 3 pages.
Menghin, M.J., "Power Optimization Techniques for Near Field Communication Systems", 2014 Dissertation at Technical University of Graz [online]. Retrieved from Internet URL: https://diglib.tugraz.at/download.php?id=576a7b910d2d6&location=browse, 135 pages.
Mareli, M., et al., "Experimental evaluation of NFC reliability between an RFID tag and a smartphone", Conference paper (2013) IEEE Africon at Mauritius [online] [retrieved on Mar. 25, 2019]. Retrieved from Internet URL: https://core.ac.uk/download/pdf/54204839.pdf, 5 pages.
Davison, A., et al., "MonoSLAM: Real-Time Single Camera Slam", IEEE Transactions on Pattern Analysis and Machine Intelligence 29(6): 1052-1067 (2007).
Barba, R., "Sharing your location with your bank sounds creepy, but it's also useful", Bankrate, LLC [online] 2017 [retrieved on Mar. 25, 2019]. Retrieved from Internet URL: https://www.bankrate.com/banking/banking-app-location-sharing/, 6 pages.
Author Unknown: "onetappayment™", [online] Jan. 24, 2019, [retrieved on Mar. 25, 2019]. Retrieved from Internet URL: https://www.payubiz.in/onetap, 4 pages.
Vu, et al., "Distinguishing users with capacitive touch communication", Proceedings of the Annual International Conference on Mobile Computing and Networking, 2012, MOBICOM. 10.1145/2348543.2348569.
Pourghomi, P., et al., "A Proposed NFC Payment Application," International Journal of Advanced Computer Science and Applications, 4(8):173-181 (2013).
Author unknown, "EMV Card Personalization Specification", EMVCo., LLC., specification version 1.0, (2003) 81 pages.
Mlmann et al., "On-Card" User Authentication for Contactless Smart Cards based on Gesture Recognition, paper presentation LNI proceedings, (2012) 12 pages.

(56) References Cited

OTHER PUBLICATIONS

Faraj, S.T., et al., "Investigation of Java Smart Card Technology for Multi-Task Applications", J of Al-Anbar University for Pure Science, 2(1):23 pages (2008).

Dhamdhere, P., "Key Benefits of a Unified Platform for Loyalty, Referral Marketing, and UGC" Annex Cloud [online] May 19, 2017 [retrieved on Jul. 3, 2019]. Retrieved from Internet URL: https://www.annexcloude.com/blog/benefits-unified-platform/, 13 pages.

International Search Report and Written Opinion for International Patent Application No. PCT/US2021/029890 dated Aug. 6, 2021, 10 pages.

* cited by examiner

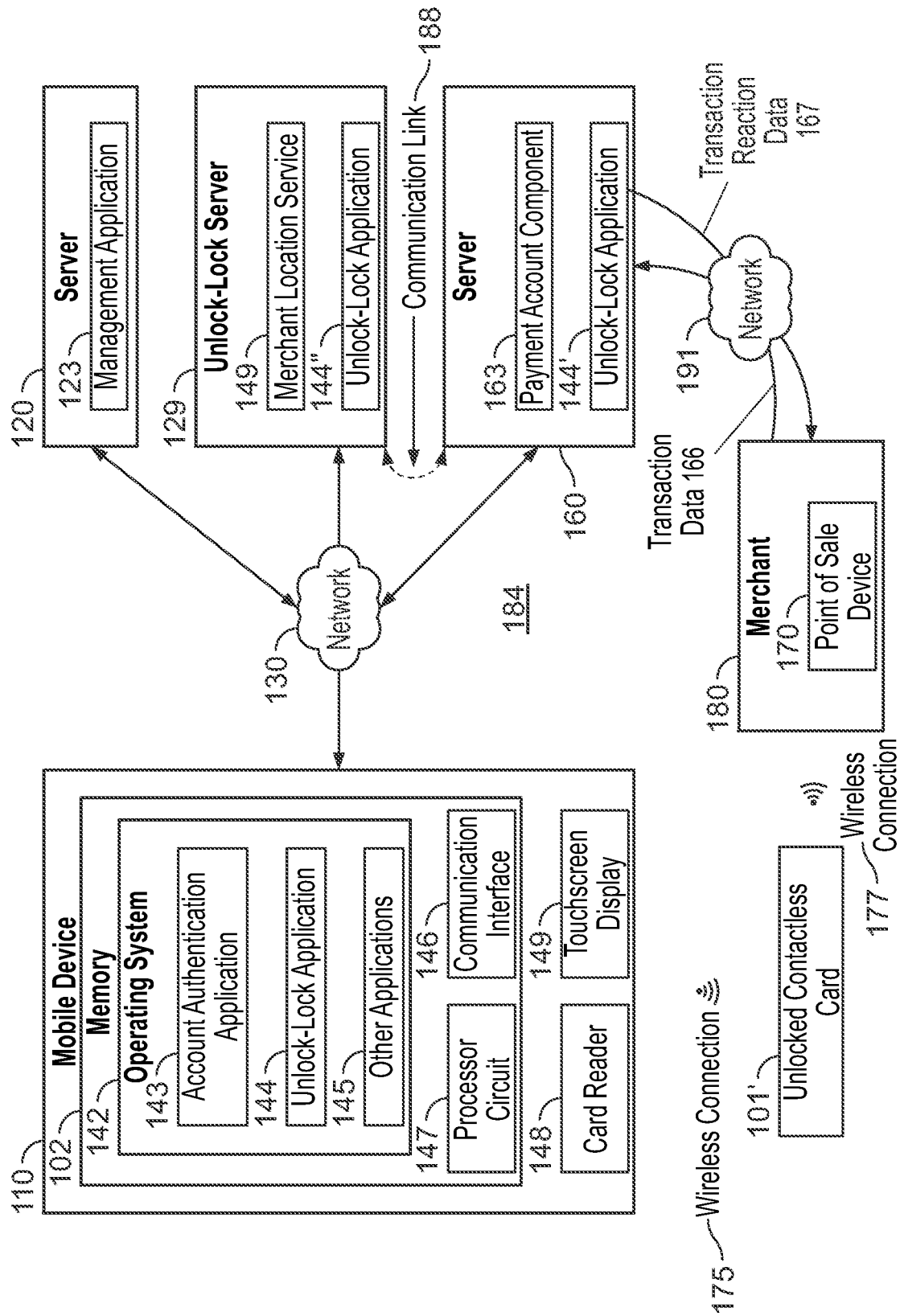

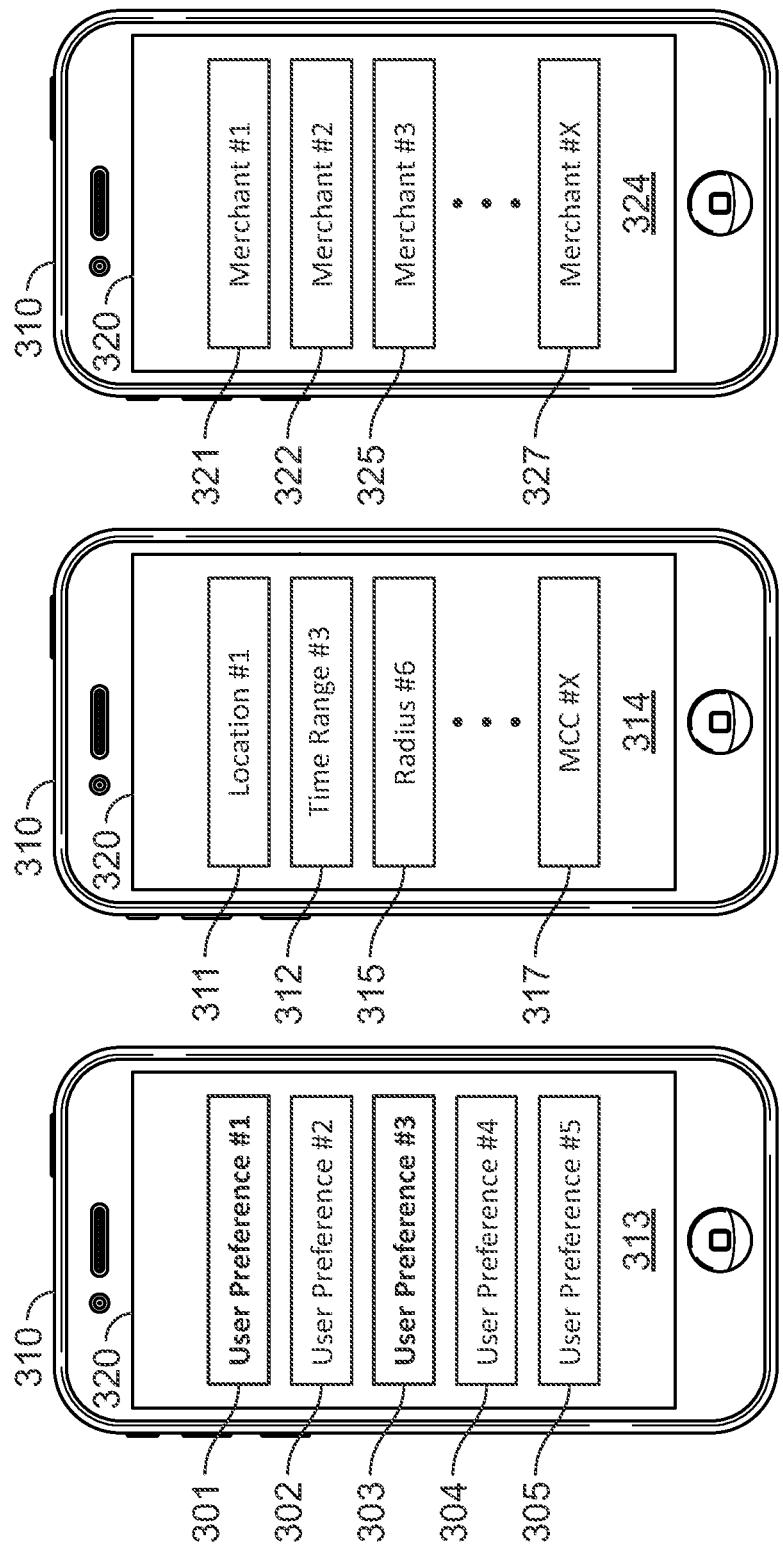

INTELLIGENT CARD UNLOCK

TECHNICAL FIELD

Examples herein generally relate to computing platforms, and more specifically, to intelligently unlocking a payment card, including a contactless card for use in a transaction.

BACKGROUND

Payment card locking functions presently allow a user to lock their payment card from being used when the card is not in possession of the user, i.e., the card is lost, stolen or misplaced. Locking the card prevents any transactions from being used in any transaction. The card lock functionality enables a user to ascertain whether the card is simply misplaced instead of stolen without having to go through all of the actions required when reporting the card lost or stolen. The actions required when reporting the card lost or stolen may include placing the account associated with the card on hold, sending a new physical card to the user via a delivery service and other inconveniences. The payment card lock functionality was developed to allow a user to avoid taking the required actions for replacement and mitigate the inconveniences.

It would be beneficial and an advantage with regard to fraud prevention and user security if the payment card could be locked at all times and easily unlocked at a user's request or at convenient times or when it is determined that the user is at a location where there is a high probability the user may locations.

SUMMARY

Examples disclosed herein provide systems, methods, articles of manufacture, and computer-readable media for enabling the unlocking of a contactless card for use in card-present transactions. According to one example, an apparatus may include a display device, a processor circuit, a transceiver, a card reader circuit and a memory. The processor circuit may be operable to present a graphical user interface on the display device. The transceiver may be coupled to the processor circuit and operable to communicate with external devices. The card reader circuit may be coupled to the processor circuit and be operable to emit and receive signals within a signal field. The memory may be coupled to the processor circuit and operable to store an unlock-lock application. The unlock-lock application may have instructions which when executed by the processor circuit, causes the processor circuit to receive, via the card reader circuit, encrypted data from a contactless card. The contactless card may be locked to prevent use in a card present transaction and the encrypted data is generated based on a cryptographic algorithm and a diversified key. The unlock-lock application executed by the processor circuit may cause the encrypted data to be forwarded to an authentication server to authenticate and unlock the contactless card. An unlock indication that the contactless card has been unlocked enabling the contactless card for use in a card present transaction may be received. The unlock indication indicates the contactless card has been authenticated. User preferences may be identified for uses of the contactless card in payment card transactions when unlocked and a representation of the identified user preferences of the contactless card may be presented in the graphical user interface presented on the display device.

Another example discloses, a system including a contactless card and a mobile device. The contactless card may include a processor, a memory, and a communications interface operable to support at least one of near field communication, Bluetooth, or Wi-Fi communication protocol. The mobile device may include a mobile device processor, a mobile device memory, a transceiver, a display device, and a card reader circuit. The card reader circuit is operable to communicate with the contactless card via the communications interface and the mobile device memory stores programming code including an instance of an unlock-lock application. The processor of the contactless card may be operable to generate encrypted data using a cryptographic algorithm and a diversified key; and emit via the communications interface, a signal containing encrypted data usable to authenticate the contactless card. The programming code when executed by the mobile device processor causes the mobile device processor to perform functions, including functions to receive from the card reader circuit the signal containing encrypted data emitted from contactless card. The encrypted data may be forwarded via the transceiver for authentication and unlocking of the contactless card. The mobile device processor may receive an unlock indication indicating the contactless card is unlocked. User preferences may be identified that allow limited uses of the contactless card when unlocked for use in card-present transactions. A representation of the identified user preferences of the contactless card, when unlocked, may be presented in a graphical user interface presented on the display device.

An example of a non-transitory computer-readable storage medium is provided. The non-transitory computer-readable storage medium may be embodied with having computer-readable program code. The computer-readable program code is executable by a processor circuit to cause the processor circuit to receive, via a card reader circuit, encrypted data from a communications interface of a contactless card. The contactless card may be locked from being used in a card present transaction and the encrypted data is generated based on a cryptographic algorithm and a diversified key. The encrypted data may be forwarded to an authentication server to enable the contactless card to be unlocked. An unlock indication that the contactless card has been unlocked for use in a card present transaction may be received. The unlock indication is verification of the encrypted data. A permitted contactless card use restriction of a capability of the contactless card to complete a payment card transaction may be identified. An unlocked-for-use status indication and a representation of the identified permitted contactless card use restriction may be presented in a graphical user interface presented on a display device.

BRIEF DESCRIPTION OF THE DRAWINGS

FIGS. 1A and 1B illustrate examples of a system for locking and unlocking card for use in a transaction.

FIGS. 3A-3C illustrate examples of locking and unlocking card for use in a transaction.

DETAILED DESCRIPTION

Figure 1A:
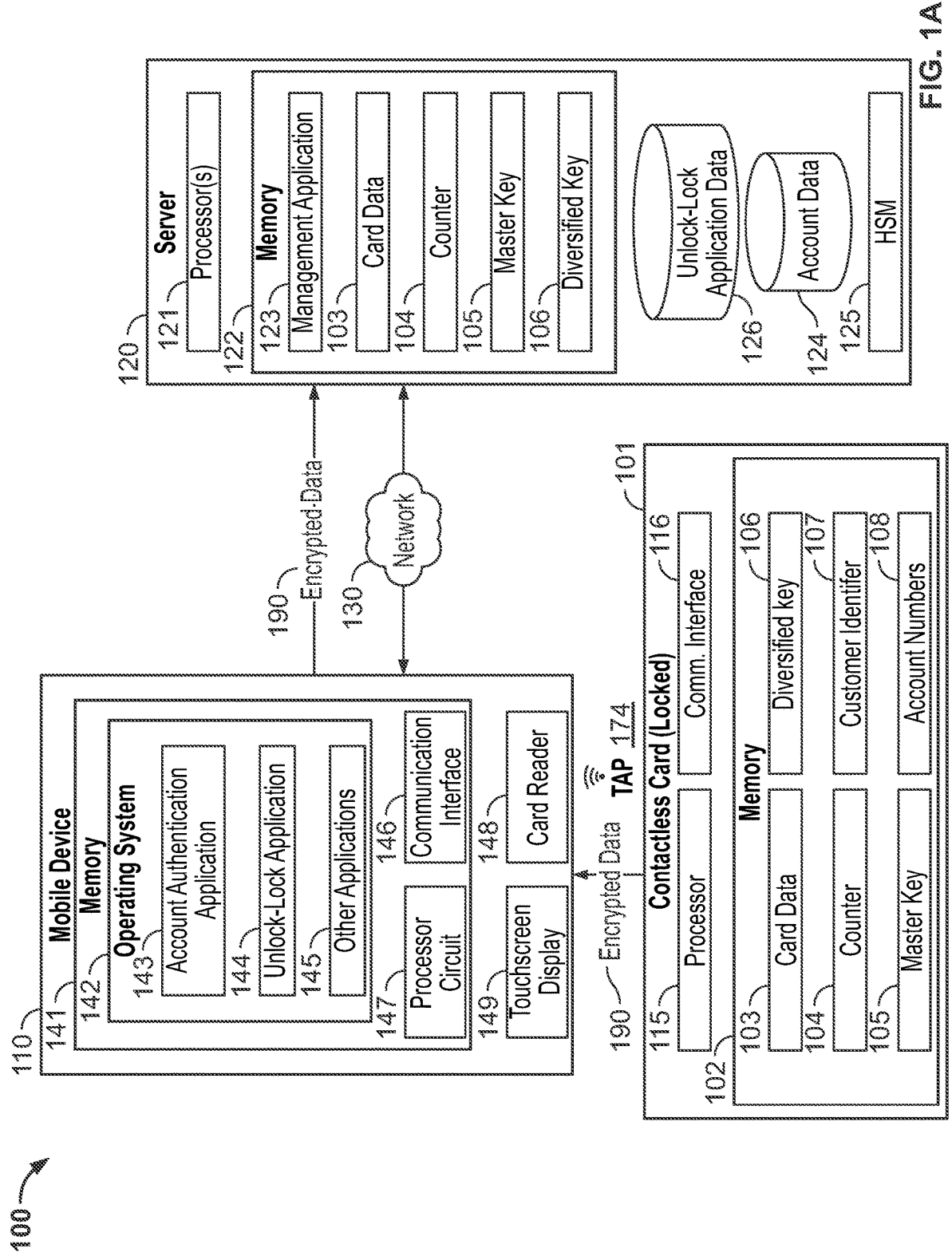

Examples disclosed herein provide secure techniques for locking and unlocking a payment card for use in a card present transaction. Commonly, a payment card is unlocked and operable to allow completion of card-present transactions with merchants. In cases of lost cards and despite being able to lock the card if it the user does not know the card is lost, there is still the opportunity for the lost card to be used in fraudulent activities. The foregoing examples advantageously provide an easy to use and implement solution that reduces the potential for credit fraud.

In the foregoing examples, the contactless card when unauthenticated is locked which makes the contactless card unusable in a card present transaction and authentication of the contactless card indicates the contactless card is valid (e.g., authenticated and assigned to an authorized user and payment account) and unlocked which makes that contactless card usable in a card present transaction.

With general reference to notations and nomenclature used herein, one or more portions of the detailed description which follows may be presented in terms of program procedures executed on a computer or network of computers. These procedural descriptions and representations are used by those skilled in the art to most effectively convey the substances of their work to others skilled in the art. A procedure is here, and generally, conceived to be a self-consistent sequence of operations leading to a desired result. These operations are those requiring physical manipulations of physical quantities. Usually, though not necessarily, these quantities take the form of electrical, magnetic, or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, these manipulations are often referred to in terms, such as adding or comparing, which are commonly associated with mental operations performed by a human operator. However, no such capability of a human operator is necessary, or desirable in most cases, in any of the operations described herein that form part of one or more examples. Rather, these operations are machine operations. Useful machines for performing operations of various examples include digital computers as selectively activated or configured by a computer program stored within that is written in accordance with the teachings herein, and/or include apparatus specially constructed for the required purpose or a digital computer. Various examples also relate to apparatus or systems for performing these operations. These apparatuses may be specially constructed for the required purpose. The required structure for a variety of these machines will be apparent from the description given.

Reference is now made to the drawings, wherein like reference numerals are used to refer to like elements throughout. In the following description, for the purpose of explanation, numerous specific details are set forth in order to provide a thorough understanding thereof. It may be evident, however, that the novel examples can be practiced without these specific details. In other instances, well known structures and devices are shown in block diagram form in order to facilitate a description thereof. The intention is to cover all modification, equivalents, and alternatives within the scope of the claims.

FIG. 1A depicts a schematic of an exemplary system 100, consistent with disclosed examples.

In the example of FIG. 1A, a mobile device 110 may include a processor circuit 147, a communication interface 146, a touchscreen display 149, and a memory 141. The memory 141 may be operable to store an account authentication application 143, an unlock-lock application 144 and other applications 145, such a messaging application, a banking application, a location application, telephone application, or the like. The respective applications 143-145 may include computer-readable programming code that is executable by a processor or processor circuit. The account authentication application 143 may provide functions and features in response to a request from the unlock-lock application 144. Examples of the functions and features provided in response to the request are described with reference to FIGS. 2A and 2B.

The touchscreen display 149, for example, may be coupled to the processor circuit 147 and be operable to present a graphical user interface (shown in another example) in response to signals from the processor circuit 147. The communication interface 146 may be operable to communicate with external devices, such as server 120, via a number of transceivers (not shown in this example). For example, the mobile device 110, which may be a smartphone equipped with a cellular transceiver and a Wi-Fi transceiver (e.g., 802.11 family of transceivers) (shown in another example). The card reader 148 may be equipped with a near-field communication (NFC) circuit that is operable to emit and receive signals within a signal field (e.g., an area within a short range, such as 2-10 centimeters) of the mobile device 110. As shown, a memory 141 of the mobile device 110 includes an instance of an operating system (OS) 142. Example operating systems 142 include the Android® OS, iOS®, Linux®, and Windows® operating systems. As shown, the OS 142 includes an account authentication application 143, an unlock-lock application 144, and one or more other applications 145. The account authentication application 143 allows users to perform various account-related operations, such as viewing account balances, purchasing items, and processing payments. Initially, a user must authenticate using authentication credentials to access the account authentication application 143. For example, the authentication credentials may include a username and password, biometric credentials, and the like.

The account authentication application when executed causes the processor circuit 147 to perform functions related to authenticating a contactless card, such as 101. For example, when the locked contactless card 101 is placed within the signal field of the card reader 148 of the mobile device 110, the contactless card 101 establish a communication path with the mobile device 110 and provide the encrypted data 190 to the account authentication application 143 of the mobile device 110. The account authentication application 143 may cause the transfer the encrypted data 190 via the network 130 to the server 120, which authenticates the contactless card 101 and unlocks the contactless card 101 for use in card-present transactions. The server 120 may provide an indication that the authentication and unlocking of the contactless card 101 was successful to the account authentication application 143 via a message through the network 130. The account authentication application 143 may provide the indication to, or otherwise notify, the unlock-lock application 144 which when executed causes the processor circuit 147 to perform functions related to limiting operation of the unlocked contactless card. The processor circuit 147 when the account authentication application 143 is executed causes the processor circuit to perform functions. In instances in which the account authentication application 143 and the unlock-lock application 144 are operating, the content of the graphical user interface may be generated or provided by the account authentication application 143 and the unlock-lock application 144 executed by the processor circuit 147.

With the foregoing operational example providing context for capabilities of the disclosed examples, it may be beneficial to describe the components of the system 100 in more detail with reference to the functions performed by the respective components.

As shown, the system 100 includes one or more contactless cards 101, one or more mobile devices 110, and a server 120. The contactless card 101 is representative of any type of payment card, such as a credit card, debit card, ATM card, gift card, and the like. The contactless cards 101 may include one or more chips (not depicted), such as a radio frequency identification (RFID) chip, operable to communicate with the mobile devices 110 via NFC, the EMV standard, or other short-range protocols in wireless communication. Although NFC is used as an example communications protocol, the disclosure is equally applicable to other types of wireless communications, such as the EMV standard, Bluetooth, and/or Wi-Fi. The mobile devices 110 are representative of any type of network-enabled computing devices, such as smartphones, tablet computers, wearable devices, laptops, portable gaming devices, and the like. The server 120 equipped with one or more processors 121 may be any type of computing device, such as a server, workstation, computer cluster, cloud computing platform, virtualized computing system, or the like.

The contactless card 101 may include a processor 115 and a communication interface 116. As described with reference to the examples of FIGS. 4A and 4B, the processor 115 may be circuitry operable to perform logical functions and the communication interface 116 may be circuitry operable to exchange signals with other devices, such as mobile device 110 and the like.

As shown, a memory 102 of the contactless card includes card data 103, a counter 104, a master key 105, a diversified key 106, a unique customer identifier 107, and a data store of account numbers 108. The card data 103 generally includes account-related information, such as information used to process a payment using the contactless card 101. For example, the card data 103 may include an account number, an expiration date, a billing address, or a card verification value (CVV). The account number may be any type of account number, such as a primary account number (PAN), a virtual account number, and/or a token generated based on the PAN. Other types of account numbers are contemplated, and the use of the account number or other types of card data 103 should not be considered limiting of the disclosure. The card data 103 may further include names, billing address, shipping address, and other account-related information. The account numbers 108 store one-time-use virtual account numbers with associated expiration dates and CVV values. For example, the account numbers 108 may include a number of single-use virtual account numbers, expiration dates, and CVV values.

As shown, the server 120 includes a data store of account data 124 and a memory 122. The account data 124 includes account-related data for a number of users and/or accounts. The account data 124 may include at least a master key 105, a counter 104, a customer ID 107, an associated contactless card 101, account holder name, account billing address, one or more shipping addresses, one or more virtual card numbers, and biographical information for each account. The memory 122 may include a management application 123 and an instance of the card data 103, an instance of the counter 104, an instance of the master key 105, and an instance of the diversified key 106 for one or more accounts from the account data 124.

The system 100 is operable to implement key diversification to secure data, which may be referred to as a key diversification technique herein. Generally, the server 120 (or another computing device) and the contactless card 101 may be provisioned with the same master key 105 (also referred to as a master symmetric key). More specifically, each contactless card 101 is programmed with a distinct master key 105 that has a corresponding pair in the server 120. For example, when a contactless card 101 is manufactured, a unique master key 105 may be programmed into the memory 102 of the contactless card 101. Similarly, the unique master key 105 may be stored in a record of a customer associated with the contactless card 101 in the account data 124 of the server 120 (and/or stored in a different secure location). The master key may be kept secret from all parties other than the contactless card 101 and server 120, thereby enhancing security of the system 100.

The master key 105 may be used in conjunction with the counters 104 to enhance security using key diversification. The counters 104 include values that are synchronized between the contactless card 101 and server 120. The value of counter 104 may include a number that changes each time data is exchanged between the contactless card 101 and the server 120 (and/or the contactless card 101 and the mobile device 110). To enable NFC data transfer between the contactless card 101 and the mobile device 110, the account authentication application 143 may communicate with the contactless card 101 when the contactless card 101 is sufficiently close to a card reader 148 of the mobile device 110. Card reader 148 may be operable to read from and/or communicate with contactless card 101 (e.g., via NFC, Bluetooth, RFID, Wi-Fi, etc.). Therefore, example card readers 148 include NFC communication modules, Bluetooth® communication modules, and/or RFID communication modules.

After the account authentication application 143 and/or the unlock-lock application 144 are launched or opened, the opened application may prompt a user to tap the contactless card 101 to the mobile device 110. For example, a user may tap the contactless card 101 to the mobile device 110, thereby bringing the contactless card 101 sufficiently close to the card reader 148 of the mobile device 110 to enable NFC data transfer between the contactless card 101 and the card reader 148 of the mobile device 110. In some examples, the mobile device 110 may trigger the card reader 148 via an API call or the like. In addition, and/or alternatively, the mobile device 110 may trigger the card reader 148 by periodically polling the card reader 148. More generally, the mobile device 110 may trigger the card reader 148 to engage in communications using any feasible method. Once the contactless card 101 is tapped (e.g., brought within NFC communications range of the card reader 148) to the mobile device 110, the account authentication application 143 either on its own initiative or in response to a signal from the unlock-lock application 144 may generate and transmit an indication to the contactless card 101 to generate an encrypted data 190 as depicted in FIG. 1A.

In response, the contactless card 101 increments the value of counter 104 and provides the master key 105 and value of counter 104 as input to a cryptographic algorithm, which produces a diversified key 106 as output. The contactless card 101 may then encrypt the customer identifier 107 using the diversified key 106 to generate the encrypted data 190. The contactless card 101 may then transmit the encrypted data 190 to the account authentication application 143 of the mobile device 110 (e.g., via an NFC connection, Bluetooth connection, etc.). The account authentication application 143 of the mobile device 110 may then transmit the encrypted data 190 to the server 120 via the network 130. In at least one example, the contactless card 101 transmits the value of counter 104 along with the encrypted data 190.

After communication has been established between mobile device 110 and contactless card 101, the contactless card 101 may generate a message authentication code (MAC) cryptogram. In particular, this may occur upon a read, such as an NFC read, of a near field data exchange (NDEF) tag, which may be created in accordance with the NFC Data Exchange Format. For example, a reader, such as the account authentication application 143 and/or the card reader 148, may transmit a message, such as an applet select message, with the applet ID of an NDEF producing applet. At this point, the value of counter 104 maintained by the contactless card 101 may be updated or incremented. At this point, the message may be generated which may include a header and a shared secret. Session keys may then be generated. The MAC cryptogram may be created from the message, which may include the header and the shared secret. The MAC cryptogram may then be concatenated with one or more blocks of random data, and the MAC cryptogram and a random number (RND) may be encrypted with the session key. Thereafter, the cryptogram and the header may be concatenated, and encoded as ASCII hex and returned in NDEF message format (e.g., responsive to another message). In some examples, the MAC cryptogram may be transmitted as an NDEF tag, and in other examples the MAC cryptogram may be included with a uniform resource indicator (e.g., as a formatted string). The contactless card 101 may transmit the MAC cryptogram to the mobile device 110, which may then forward the MAC cryptogram to the server 120 for verification as explained below. However, in some examples, the mobile device 110 may verify the MAC cryptogram.

More generally, when preparing to send data (e.g., to the server 120 and/or the mobile device 110), the contactless card 101 may increment the value of counter 104. The contactless card 101 may then provide the master key 105 and value of counter 104 as input to a cryptographic algorithm, which produces a diversified key 106 as output. The cryptographic algorithm may include encryption algorithms, hash-based message authentication code (HMAC) algorithms, cipher-based message authentication code (CMAC) algorithms, and the like. Non-limiting examples of the cryptographic algorithm may include a symmetric encryption algorithm such as 3DES or AES128; a symmetric HMAC algorithm, such as HMAC-SHA-256; and a symmetric CMAC algorithm such as AES-CMAC. The contactless card 101 may then encrypt the data (e.g., the customer identifier 107 and any other data) using the diversified key 106. The contactless card 101 may then transmit the encrypted data (e.g., the encrypted data 190) to the account authentication application 143 of the mobile device 110 (e.g., via an NFC connection, Bluetooth connection, etc.). For example, the contactless card 101 may be operable to emit encrypted data via a tap 174 as well as receive signals when the contactless card is within a signal field of the card reader 148. Similarly, the card reader 148 may be operable to also emit signals and receive signals. In more detail, the card reader 148 may receive the encrypted data 190 via tap 174 while the contactless card 101 is locked. The account authentication application 143 of the mobile device 110 may then transmit the encrypted data to the server 120 via the network 130. In at least one example, the contactless card 101 transmits the value of counter 104 with the encrypted data. In such examples, the contactless card 101 may transmit a value of counter 104 that is either an encrypted or an unencrypted value of the counter 104.

Upon receipt of the encrypted data 190 from the mobile device 110, the management application 123 of the server 120 may be operable to verify the encrypted data 190 using key diversification. Key diversification performed by the management application 123 of the server 120 may include performing the same symmetric encryption using the value of counter 104 as input to the encryption (by the processor 115 of the contactless card), and the master key 105 as the key for the encryption. As stated, the value of counter 104 may be specified in data received with the encrypted data 190 from the mobile device 110, or a value of counter 104 maintained by the server 120 to implement key diversification for the contactless card 101. The output of the encryption may be the same diversified key value 106 that was created by the contactless card 101. The management application 123 may then decrypt the encrypted data 190 received via the network 130 using the diversified key 106, which reveals the data transmitted by the contactless card 101 (e.g., at least the customer identifier 107). Doing so allows the management application 123 to verify the data transmitted by the contactless card 101 via the mobile device 110, e.g., by comparing the decrypted customer ID 107 to a customer ID in the account data 124 for the account, where, for example, a match of the customer ID values verifies the encrypted data received from the contactless card 101.

Although the counter 104 is used as an example, other data may be used to secure communications between the contactless card 101, the mobile device 110, and/or the server 120. For example, the counter 104 may be replaced with a random nonce, generated each time a new diversified key 106 is needed, the full value of a counter value sent from the contactless card 101 and the server 120, a portion of a counter value sent from the contactless card 101 and the server 120, a counter independently maintained by the contactless card 101 and the server 120 but not sent between the two, a one-time-passcode exchanged between the contactless card 101 and the server 120, and a cryptographic hash of data. In some examples, one or more portions of the diversified key 106 may be used by the parties to create multiple diversified keys 106.

As shown, the server 120 may include one or more hardware security modules (HSM) 125. For example, one or more HSMs 125 may be operable to perform one or more cryptographic operations as disclosed herein. In some examples, one or more HSMs 125 may be configured as special purpose security devices that are operable to perform the one or more cryptographic operations. The HSMs 125 may be configured such that keys are never revealed outside the HSM 125, and instead are maintained within the HSM 125. For example, one or more HSMs 125 may be operable to perform at least one of key derivations, decryption, and MAC operations. The one or more HSMs 125 may be contained within, or may be in data communication with, server 120.

After authenticating the locked contactless card 101, and subsequently unlocking the contactless card for use in card present transactions, the components of system 100 may operate according to the system example shown in FIG. 1B and the accompanying discussion.

As shown in the system example of FIG. 1B, the system 184 in addition to the mobile device 110, network 130 and server 120, which perform the same functions, the system 184 further includes the unlock-lock server 129, a server 160 that hosts an payment account component 163, a point of sale device 170 at a merchant 180, and a network 191 that couples the point of sale device 170 to the payment account component 163 of server 160. The unlock-lock server 129 may include a processor, and memory with programming code or instructions, and may be operable manage, via an instance of the unlock-lock application 144", user preference settings that limit the use of the unlocked contactless card 101' as well as a number of unlocked contactless cards belonging to other users.

Returning to the operational example, in response to sending the encrypted data 190 to the server 120, the processing circuit 147 executing the account authentication application 143 may receive from the server 120 an indication that the contactless card 101 has been unlocked based on an authentication of the encrypted data 190. The indication that the contactless card has been unlocked and authenticated may be output to the unlock-lock application 144 by the account authentication application 143.

In another example, the unlock-lock server 129 may be operable to receive, from the mobile device 110, user preference settings indicated as selected for permitted uses of the contactless card in card present transactions, when the contactless card is unlocked. The unlock-lock server 129 may be further operable to obtain the determined location of the mobile device from the mobile device 110 via a location application executing as one of the other applications 145. The location of the mobile device 110 may be used by the instance of the unlock-lock application 144" to generate a list of merchants that satisfy the limited card uses of the user preferences.

The unlock-lock server 129 may be operable to manage user preferences of the unlock-lock application executing on the mobile device processor (i.e., processor circuit 147) of the mobile device 110. In a more detailed example, the unlock-lock server 129 may be operable to receive, from the mobile device, user preference settings indicated as selected, permitted uses of the unlocked contactless card in card-present transactions. The unlock-lock sever may be operable to derive a maximum transaction amount threshold from the user preference settings. For example, the user preference may be set at $50.00 for a transaction at a restaurant or the like. The unlock-lock server 129 may forward a maximum transaction amount threshold derived from the user preference settings to the payment account component 163 of server 160, via either the communication link 188 or the network 130. The communication link 188 may be a direct communication coupling between the unlock-lock server 129 and the server 160. The maximum transaction amount threshold may also be forwarded to the mobile device 110 for presentation in a graphical user interface presented on the touchscreen display 149.

As mentioned above with respect to FIG. 1A above, once the management application 123 of server 120 verifies the encrypted data 190 using key diversification, the management application 123 may transmit an indication of authentication to the account authentication application 143 of the mobile device 110, which may, in one example, establish a connection to an application programming interface (API) of the unlock-lock application 144 and provide the indication of authentication to the unlock-lock application 144. Upon receipt of the indication of authentication which the unlock-lock application 144 interprets as an indication that contactless card 101' is unlocked, the unlock-lock application 144 may send a request to unlock-lock server 129 regarding limiting use of the unlocked contactless card 101'. The limiting uses (which are described in more detail with reference to other examples) may include a list of merchants within an area that are whitelisted for card-present transactions using the unlocked contactless card 101'. Merchant 180 may be on the list of whitelisted merchants. The unlocked contactless card 101' has the features as contactless card 101 with the only difference being that unlocked contactless card 101' is now unlocked and enable to participate in some card-present transactions, subject to the limiting uses described herein. For example, the unlocked contactless card 101' may be operable to communicate with card reader 148 via a wireless connection 175. Unlocked contactless card 101' may be presented for a card-present transaction, and transaction data 166 may be transmitted via wireless connection 177 from the contactless card 101' to the point of sale device 170 of the merchant 180. The transaction data 166 may be, for example, information used for completion of the transaction, such as a card number, account number or some other identifying information that may be used to verify whether the contactless card 101' is coupled to an authorized payment account. Of course, if the contactless card 101' is equipped with an identifying chip or a magnetic strip, the information required for the transaction may be transmitted by inserting the identifying chip into or swiping the magnetic strip through the point of sale device 170 to provide the transaction data 166. The point of sale device 170 at the merchant 180 may be operable to forward the transaction data 166 through the network 191 to the payment account component 163 for a verification process.

The server 160 may be operable to receive the transaction data 166 to determine whether the transaction may be completed based on a verification process performed by the payment account component 163. For example, the payment account component 163 may use the transaction data 166 to process the financial aspects of the transaction, such as, for example, verify that the transaction is a card-present transaction, the payment account of the user associated with the unlocked contactless card 101' is valid and has sufficient credit or funds, that the contactless card 101' is unlocked for the card-present transaction, that the user preference settings provided by the unlock-lock application 144 are satisfied, and the like. The server 160 Transaction reaction data 167, which may be an indication of a result of the verification process performed by the payment account component 163, may be returned through the network 191 to the point of sale device 170.

The payment account component 163 may include additional capabilities beyond enabling completion of the card-present transaction. The payment account component may include query logic or machine learning that may be applied to past transactions to identify patterns or trends and whitelist those transactions that are considered low risk. For example, the patterns or trends may reveal frequent visits to certain merchants, dollar thresholds a user frequently does not exceed, and/or location patterns, such as consistently purchasing meals within 1 mile of the user's office or home, and/or during specific hours. These patterns and trends may be used to identify new user preferences or modify existing user preferences. For example, in situations, where a new restaurant or coffee shop opens within a set radius, a user preference may be modified to generate a list of any lunch place having a particular merchant category code being enabled to allow completion of a card-present transaction. For example, the modified user preference may also be to allow any restaurant purchase under $25 within 1 mile of the user's office, or the like.

The example of FIG. 1B shows the management application 123 of the server 120 transmitting the card data 103 from the server 120 to the mobile device 110 after verifying the encrypted data 190 of FIG. 1A. In at least one example, the management application 123 may encrypts the card data 103 before sending to the account authentication application 143. As stated, the card data 103 may include the account number, CVV, and/or expiration date of the contactless card 101. The card data 103 may further include the account holder's first name, last name, shipping address, and billing address. In one example, the account number of the card data 103 may be the virtual card number generated subsequent to the verification of the encrypted data 190 by the management application 123. In another example, the account number of the card data 103 is a record from the account numbers 108. In one example, the first and last names are stored in the account authentication application 143 (or another element of the OS). The account authentication application 143 may provide the card data 103 and/or the indication of the authentication of the encrypted data 190 to an API of the unlock-lock application 144. The unlock-lock application 144 may use interpret information provided by the account authentication application 143 to determine whether the contactless card is unlocked for card-present transactions, and, if so, implement the user-preferences as discussed with reference to this example and the examples of FIGS. 2A-3C.

In one example, the card data 103 sent by the server 120 to the mobile device 110 includes all relevant information (e.g., the account number, expiration date, CVV, billing address, shipping address, first name, last name, etc.) required to make a purchase using the account associated with the contactless card 101.

In an example, the network 130 may couple to other servers in addition to server 120. For example, the mobile device processor circuit 147 may be operable to obtain a location preference setting from a number of user preference settings stored in memory 141. The mobile device processor circuit 147 may obtain location data from a location application of the location and other applications 145. The location data may include a position, a timestamp and a velocity. The obtained location preference setting and the obtained location data to may be sent to an unlock-lock server 129. In response, the mobile device processor circuit 147 may receive a list of merchants satisfying the obtained location preference setting based on the obtained location data. The processor circuit may present the list of merchants in the graphical user interface on a display device, such as the touchscreen display 149.

Figure 6:
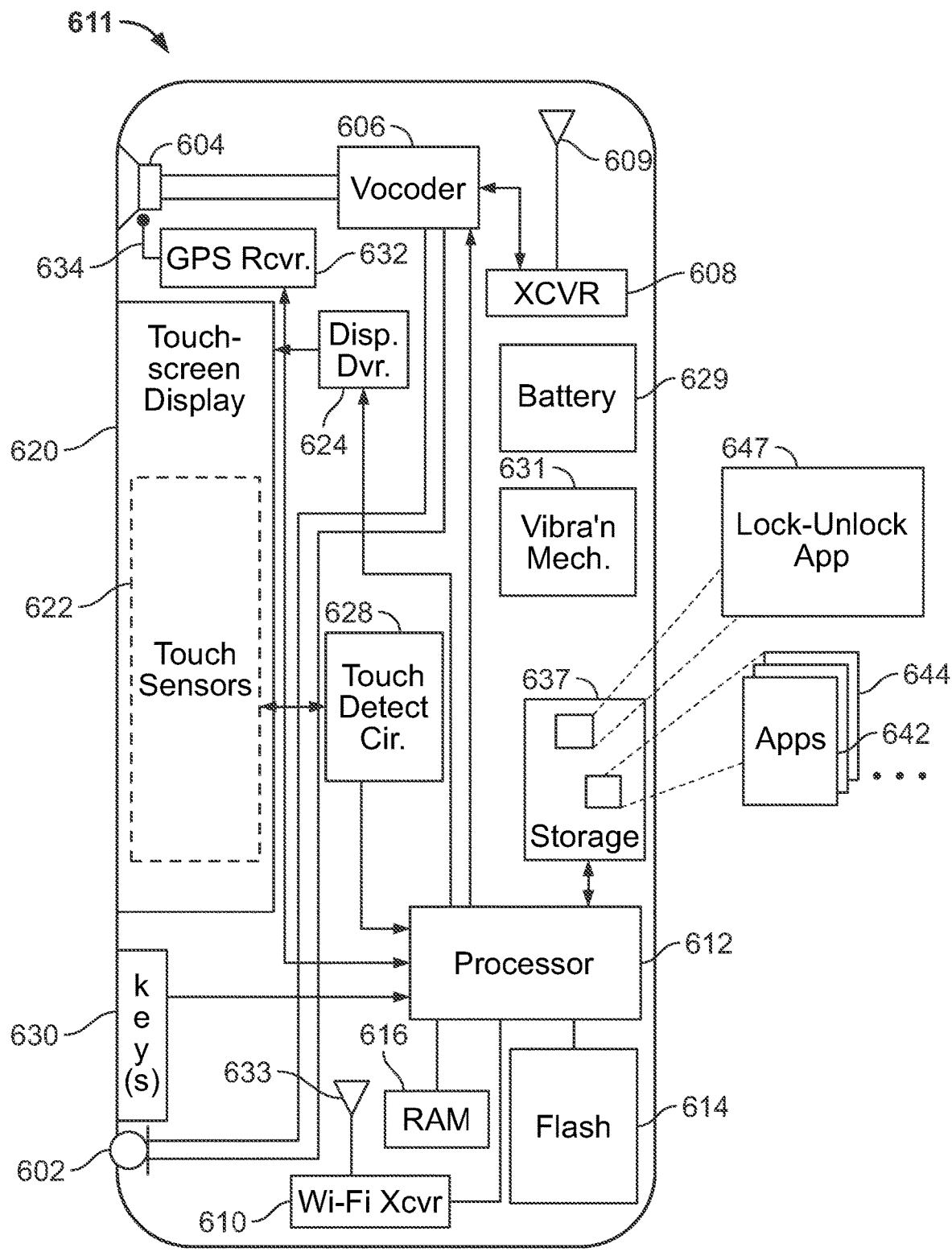
FIG. 6 illustrates an example of a computing architecture suitable for implementing the examples of FIGS. 1-5.

The mobile device processor circuit 147 may be further operable to determine, based on the location data provided by the location application, a card unlock action is required to meet an imminent a card present transaction. The processor circuit may generate instructions to produce a notification indicating the card unlock action is required. A notification actuation signal operable to actuate an output device or a display device according to the generated instructions may be output. An example of an output device and a display device are shown in the example of FIG. 6.

Figure 2A:
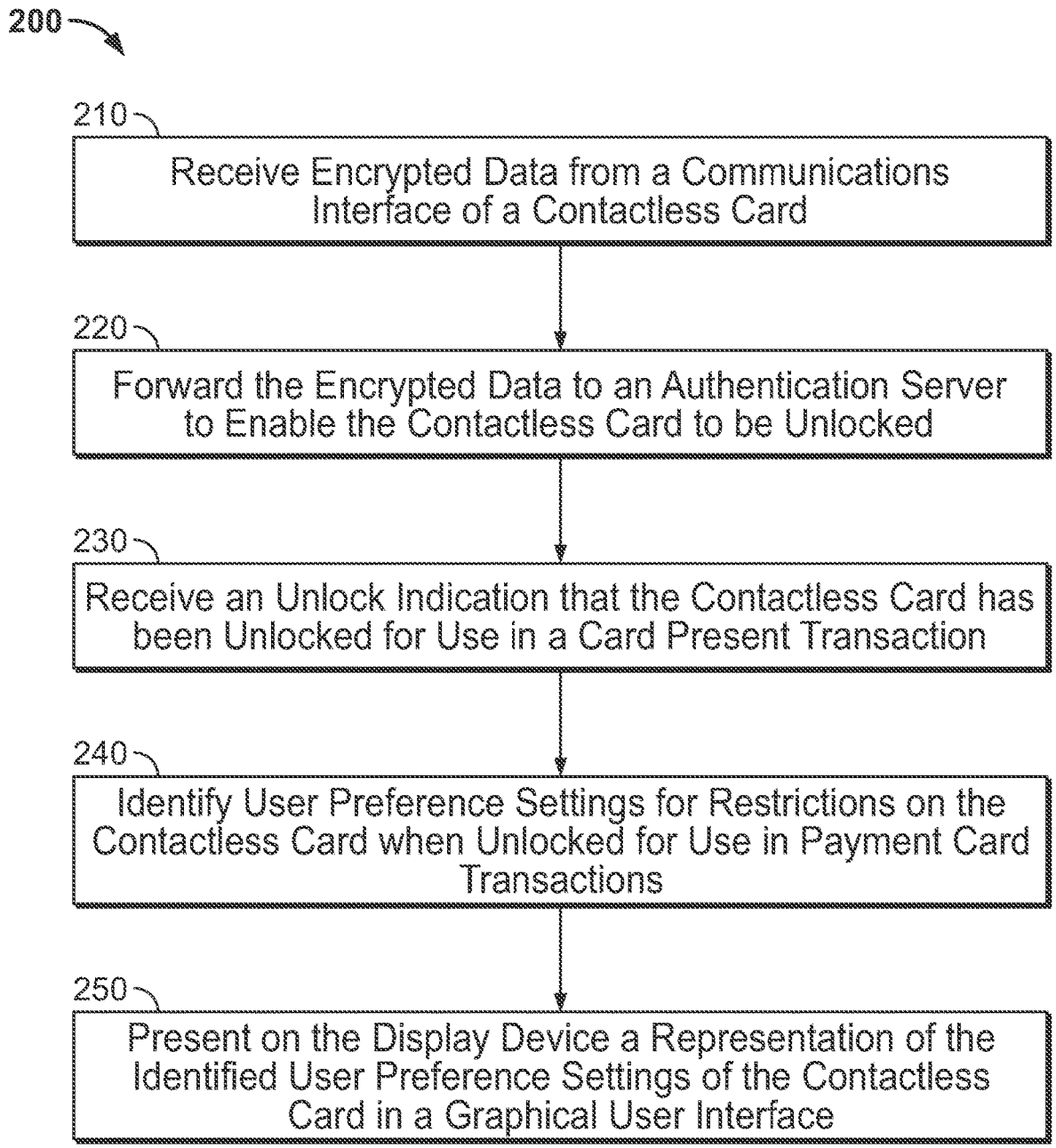
FIGS. 2A and 2B illustrate examples of locking and unlocking card for use in a transaction.

FIG. 2A is a flowchart illustrating an example of a process that utilizes the system example of FIG. 1. The process 200 may be executed by the mobile device 110 of FIG. 1A or 1B. The execution of the unlock-lock application and an authentication application may make the processor circuit 147 of the mobile device 110 operable to, at 210, receive, via the card reader circuit, encrypted data from a contactless card. For example, the contactless card may be locked to prevent use in a card present transaction and the encrypted data is generated based on a cryptographic algorithm and a diversified key generated by the contactless card. At 220, the encrypted data may be forwarded to an authentication server to authenticate and unlock the contactless card. For example, the authentication server may be operable to decrypt the encrypted data and verify the decrypted data to authenticate the contactless card. With a successful verification and resulting authentication, the contactless card may be unlocked for card-present transactions. The authentication server may be operable to generate, based on a verification of the decrypted data, the unlock indication that the contactless card is unlocked, and forward the unlock indication to the mobile device. The mobile device processor may receive the unlock indication that the contactless card has been unlocked enabling the card for use in a card present transaction (230). In addition, the unlock indication may indicate the contactless card has been authenticated and unlocked. The processor may be further operable to identify, at 240 user preferences for use of the contactless card when unlocked for use in payment card transactions. User preferences may include, for example, leaving the card unlocked for a set number of card present transactions (e.g., next 10 transactions or 20 transactions), allow relocking by manual tapping to phone, location (such as area between commuter drop off and office location, a particular business district, a shopping mall location, travel destination, or the like); amount of money spent (e.g., total of $100.00 for all transactions, $50.00 maximum for individual transactions, or the like), time increments (e.g., for next 6 hours, 1 hour, 45 minutes, length of commute or trip), or a re-lock setting in which the card is re-locked (or transition to a default state (e.g., a complete or a partial lock for some transactions) after an unlock duration, such as after one of the foregoing user preference time settings, after a default time setting, after the number of transaction or another setting). Alternatively, a server, such as 120 or 129 of FIG. 1 may, for example, according to a default setting or a user preference, automatically re-lock the card so that card present transactions are no longer possible without unlocking a subsequent time. At 250, the processor may present a representation of the identified user preferences of the contactless card in the graphical user interface presented on the display device, which may be a touchscreen display.

Figure 2B:
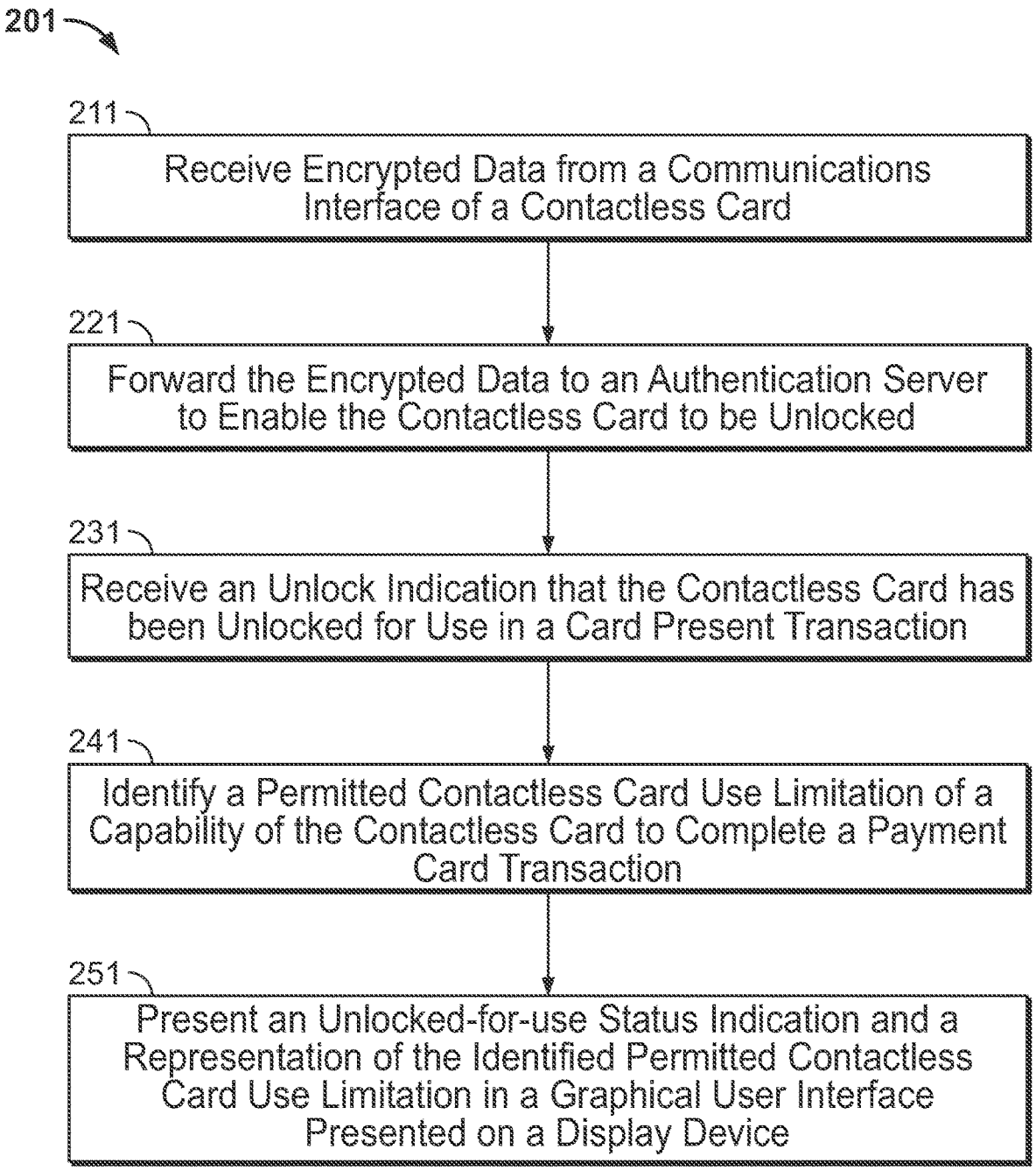

FIG. 2B is another example of a process that may be implemented upon execution of an unlock-lock application 144 enable unlocking of a contactless card. The process 201 may be implemented as a mobile computing application that may provide permitted uses of an unlocked contactless card. The mobile computing application, such as the unlock-lock application 143 of FIG. 1, may be stored as a non-transitory computer readable medium in a memory and may be implemented by a processor or processing circuitry. In the example process 201, the processor may receive, via the card reader circuit, encrypted data from a communications interface of a contactless card (211). For example, a contactless card may be locked from being used in a card present transaction and the encrypted data is generated based on a cryptographic algorithm and a diversified key that are implemented and stored on the contactless card. The processor may cause the encrypted data to be forwarded to an authentication server to enable the contactless card to be unlocked (221). At 231, the processor executing the unlock-lock application on the mobile device may receive an unlock indication that the contactless card has been unlocked for use in a card present transaction. In addition, the indication may serve as verification by the server that the encrypted data was provided by an authorized user of the card or the like. The unlock-lock application executed by processor may identify a permitted contactless card use restriction of a capability of the contactless card to complete a payment card transaction (241). For example, a whitelist of merchants may be stored in a database maintained by the server, such as the unlock-lock application data 126 of FIG. 1A. In response to verifying that the encrypted data was provided by an authorized user of the card, the server may deliver a portion of or all of the whitelist of merchants to the unlock-lock application of the mobile device. The unlocked contactless card may only be usable (i.e., permitted for use) to conduct card-present transactions at the merchants included in the whitelist of merchants. For example, the server may receive user preference settings from the unlock-lock application of the mobile device. The user preference settings may indicate a time setting, a time and area setting that the user prefers, such as at 9 am allow card-present transactions to be made within 5 square blocks or half square mile of the user's location, the user's office or home location, an area setting, a merchant code setting (e.g., only coffee shops, restaurants and drug stores). Other settings may be based on a geographical location, a geo-fenced area, a merchant name, a price threshold, a time threshold, a day of the week, a time range within a day, a zip code, an area code; a merchant category, a product category, or the like. A time threshold may be a default timer, such as 30 minutes from the time of unlocking the contactless card. In an example, geo-fencing is a feature of a computer program that enables the developer or administrator to define geographical boundaries using a mobile device's location services such as global positioning system (GPS) or radio frequency identification tags (RFID) (if permitted by the mobile device's user) or using Wi-Fi or cellular data that is usable in determining location. A geo-fenced area may, for example, be an area enclosed by a radius or set by the zip code, or governmental boundary, such as a city or county designation or the like. In the example, the whitelist of merchants may be based on a user selecting a merchant code for limiting use of an unlocked contactless card at merchants assigned the merchant code.

At 251, the mobile device may present an unlocked-for-use status indication (e.g., unlocked, an icon of an opened lock, or the like) and a representation of the identified permitted contactless card use restriction in the graphical user interface presented on the display device. For example, the representation may be the delivered portion of the whitelist of merchants or a map of the identified area setting or the like. In an example, the processor may present, via the graphical user interface, a number of limiting uses of the contactless card for a selection of a user preference that sets the limiting use of the contactless card. The limiting uses may include one or more of: a geographical location, a geo-fenced area, a merchant name, a price threshold, a time threshold, a day of the week, a time range within a day, a zip code, an area code; a merchant category, a product category, or the like.

The processor circuit may be further operable to receive, via a graphical user interface, a selection of a user preference that sets the limiting use of the contactless card. Location information may not be available until user opens an application, such as when the user requests (at 211 in the example of FIG. 2B) to unlock the card may launch the unlock-lock application which may have permission to access or obtain location information from a location application or service, such as GPS, Wi-Fi location services or the like. For example, the location application may be operable to determine a location of the apparatus. In the example, the memory may be operable to store a number of user preference settings for an unlock-lock application and further instructions which when executed by the processor circuit. The processing circuit may be operable to determine, based on location provided by the location application, a card unlock action is required to meet an imminent a card present transaction. The processing circuit may be operable to generate instructions to produce a notification indicating the card unlock action is required and output a notification actuation signal operable to actuate an output device or a display device according to the generated instructions. For example, the processing circuit may present a prompt in a graphical user interface indicating a locked status of the contactless card.

In an operational example, in response to the indication of authentication, the unlock-lock application 144 may generate a list of card use restriction s in a graphical user interface based on user preferences maintained by the unlock-lock application 144 and present the generated list of card use restriction s in the graphical user interface (shown in another example).

The processing circuit may be operable to present on the graphical user interface a menu of user preference settings for selection by a user. The user preference settings may be permitted uses of an unlocked contactless card in card present transactions that by being selected allow a user to customize the use of their contactless card when it is unlocked. For example, as shown in FIG. 3A, the menu in the graphical user interface 313 may include a number of user preferences 301-305. The user may select one or more of the presented user preferences 301-305. As shown in FIG. 3A, the user preference #1 301 and user preference #3 303 are shown in bold to indicate that these user preferences have been selected by the user.

The processing circuit may be operable to receive an indication of a selection of one or more of the user preference settings presented in the menu. FIG. 3B illustrates an example of a graphical user interface showing a selection of user preference settings. For example, the mobile device 310 may present a graphical user interface 314 on a display device 320. The unlock-lock application may present selections which may be via a touch, when the display device is a touchscreen, to the graphical user interface 314. Examples of the selecting user preference setting may include a selection of a location such as location #1 317, a time range selection, such as time range #3 311, an area selection, such as radius #6 and a merchant category code, such as MCC #X 315. In the example, the time range selection may identify a time range during which the contactless card remains unlocked. An area selection may identify an area in which the contactless card may be used in card-present transactions when the card is unlocked. For example, the area may be defined by a radius from the location of the user, an area in square city blocks or square miles or feet, or some other way of indicating area, such as zip code or other postal code. For example, the radius selection may identify a distance from a user's location in which the contactless is permitted to be used in a card-present transaction. The merchant category code selection identifies a category of goods or services provided by merchants assigned a merchant category code for the goods or services provided by the respective merchant.

The processing circuit may obtain a location preference setting from the number of user preference settings stored in the memory (see, for example, the location #1 setting 317 of FIG. 3B). The unlock-lock application executed by the processing circuit may be operable to obtain location data from the location application also executing on the processor circuit. The unlock-lock application may cause the processing circuit to be operable to send the obtained location preference setting and the obtained location data to an unlock-lock server. The unlock-lock server may be able to identify a number of merchants that satisfy the obtained location preference setting. For example, the unlock-lock server may be operable to access information about merchants that satisfy the respective location preference setting as well as other user preference settings. The unlock-lock application may receive a list of merchants satisfying the obtained location preference setting or other settings based on the obtained location data.

Returning to the example of FIG. 2A, the processing circuit may operable to communicate via the unlock-lock application with a server, such as 120 of FIG. 1, that is operable to manage user preferences of the unlock-lock application. In an example, the processing circuit may be operable provide the user preference settings indicated as selected for permitted use of the unlocked contactless card in card present transactions.

In the examples, the merchant name or merchant category code (e.g., grocery store, professional services or the like (Per IRS revised procedure 2004-43, a Merchant Category Code (MCC) is a classification code that is assigned by a payment card organization to a merchant/payee. The payment card organization assigns the merchant a particular code based on the predominant business activity of the merchant)). The merchant category code allows users to make card present purchases at establishments that are new to area. For example, the restaurant is so new to the area that the user has not made a card present purchase there or that has not been established in the mapping applications used for location services.

FIG. 3A is an example of a graphical user interface (GUI) of the unlock-lock application 144 on the mobile device 110. For example, the processor may be operable to the processor may drive a display device, such as a touchscreen display of the mobile device to present a graphical user interface with a number of user preferences for setting the limiting use of the contactless card. The respective user preferences 301-305 may include settings based on a geographical location, a geo-fenced area, a merchant name, a price threshold, a time threshold, a day of the week, a time range within a day, a zip code, an area code; a merchant category, a product category, or the like.

Once the contactless card 101 is tapped to the mobile device 110, the account authentication application 143 transmits, via the card reader 148 (e.g., via NFC, Bluetooth, RFID, and/or the EMV protocol etc.), an indication to the contactless card 101. In one example, the indication may specify to perform encryption using key diversification as depicted in FIG. 1A, in which case the account authentication application 143 receives card data 103 from the server 120. In another example, the indication may specify to transmit the card data 103 to the account authentication application 143 in an NDEF file (e.g., via NFC, Bluetooth, RFID, etc.), in which case the account authentication application 143 receives the card data 103 in an NDEF file directly from the contactless card 101 via the card reader 148. In another example, the indication may specify to transmit the card data 103 to the account authentication application 143 via the EMV protocol, in which case the account authentication application 143 receives the card data 103 directly from the contactless card 101 via the EMV protocol. However, as stated, in examples where the EMV protocol is used, the CVV value is received from the contactless card 101 in an NDEF file and/or from the management application 123. In another example, the indication may specify to perform encryption using key diversification as depicted in FIG. 1A and transmit an account number 108 to the account authentication application 143, in which case the account authentication application 143 receives a record from the account numbers 108 from the contactless card 101 (which is used subject to verification of the encrypted data 190 by the server 120).

FIG. 3B is an illustration of a mobile device 310 that is presenting a graphical user interface 314 containing a selection of user preferences settings 311-317. The mobile device may be operable to send the selected user preferences settings 311-317 to a server. For example, the server may receive user preference settings from the unlock-lock application of the mobile device. The user preference settings 311-317 may indicate, for example, a time setting, a time and area setting that the user prefers, such as at 9 am allow card-present transactions to be made within 5 square blocks or half square mile of the user's location, the user's office or home location, an area setting, a merchant code setting (e.g., only coffee shops, restaurants and drug stores).

As shown in FIG. 3C, the unlock-lock application may be operable to present the list of merchants 321-327 in the graphical user interface 324 on the display device 320 (e.g., a touchscreen display) of the mobile device 310. For example, as mentioned above, the mobile device 110 may provide a location of the mobile device to the unlock-lock server 129. In more detail, the unlock-lock server 129 may retrieve a location setting from the user preference settings, provided via the graphical user interface 313 of FIG. 3A. In the example, the location setting may be a radius (such as radius #6 in graphical user interface 314 of FIG. 3B) from a predetermined location. The predetermined location may be, for example, the location of the mobile device, the user's office, home, friend's home, favorite restaurant, gym or the like. The unlock-lock server 129 may access a merchant location service, such as 149, based on the user preference settings. From the merchant location service 149, the instance of the unlock-lock application 144" may obtain a list of merchants, such as merchant #1 to #X based on the retrieved location setting and the determined location. The instance of the unlock-lock application 144" may be operable to generate a list of merchants based on the retrieved location setting and the determined location of the mobile device. The generated list of merchants may be forward to the mobile device 110 via network 130, for example. In the example of FIG. 3C, the mobile device 310 may be operable to present the list of merchants 321-327 in the graphical user interface 324 on the display device 320 of the mobile device 310.

Figure 4A:
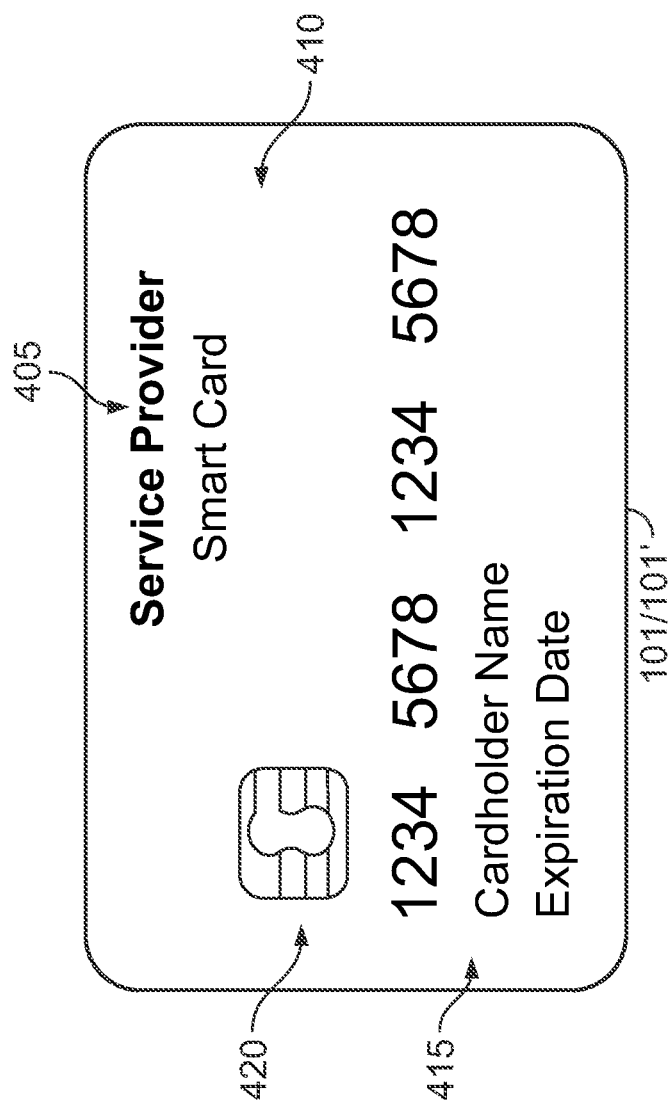
FIGS. 4A and 4B illustrate an example contactless card suitable for use in the examples of FIGS. 1-2B.

FIG. 4A illustrates a contactless card 101/101', which may include a payment card, such as a credit card, debit card, and/or a gift card. As shown, the contactless card 101/101' may be issued by a service provider 405 displayed on the front or back of the card 101/101'. In some examples, the contactless card 101/101' is not related to a payment card, and may include, without limitation, an identification card.

In some examples, the payment card may include a dual interface contactless card. The contactless card 101/101' may include a substrate 410, which may include a single layer, or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the contactless card 101/101' may have physical characteristics compliant with the ID-1 format of the ISO/IEC 7810 standard, and the contactless card may otherwise be compliant with the ISO/IEC 14443 standard. However, it is understood that the contactless card 101/101' according to the present disclosure may have different characteristics, and the present disclosure does not require a contactless card to be implemented in a payment card.

The contactless card 101/101' may also include identification information 415 displayed on the front and/or back of the card, and a contact pad 420. The contact pad 420 may be operable to establish contact with another communication device, such as the mobile devices 110, a user device, smart phone, laptop, desktop, or tablet computer. The contactless card 101 may also include processing circuitry, antenna and other components not shown in the example of FIG. 4A. These components may be located behind the contact pad 420 or elsewhere on the substrate 410. The contactless card 101/101' may also include a magnetic strip or tape, which may be located on the back of the card (not shown in FIG. 4A).

Figure 4B:
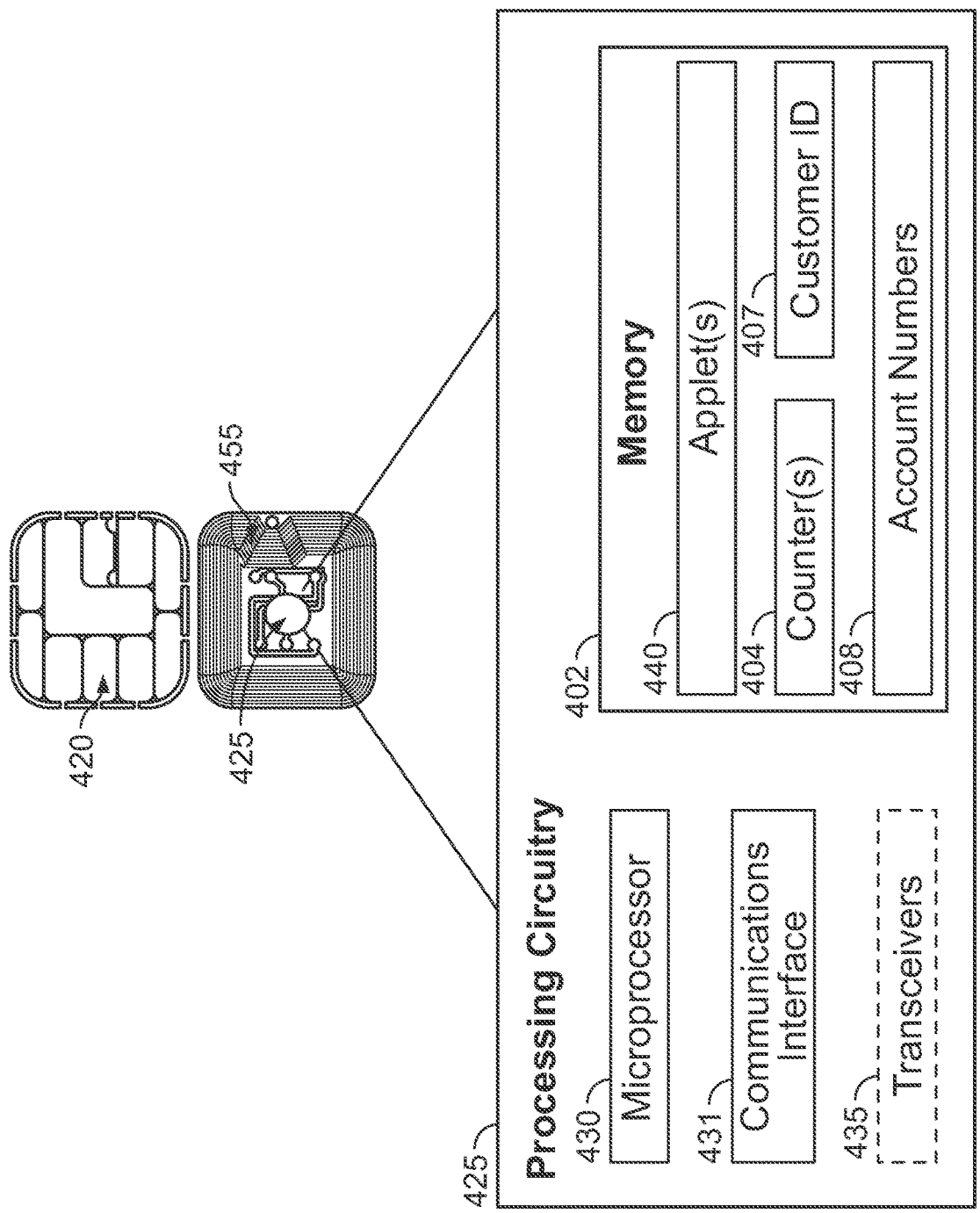

As illustrated in FIG. 4B, the contact pad 420 of contactless card 101/101' may include processing circuitry 425 for storing and processing information, including a microprocessor 430, communications interface 431, and the memory 402. It is understood that the processing circuitry 425 may contain additional components, including processors, memories, error and parity/CRC checkers, data encoders, anti-collision algorithms, controllers, command decoders, security primitives and tamper-proofing hardware, as necessary to perform the functions described herein.

The memory 402 may be a read-only memory, write-once read-multiple memory or read/write memory, e.g., RAM, ROM, and EEPROM, and the contactless card 101/101' may include one or more of these memories. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programed many times after leaving the factory. A read/write memory may also be read many times after leaving the factory.

The memory 402 may be operable to store one or more applets 440, one or more counters 404, a customer identifier 407, and virtual account numbers 408. The one or more applets 440 may include one or more software applications operable to execute on one or more contactless cards, such as a Java® Card applet. However, it is understood that applets 440 are not limited to Java Card applets, and instead may be any software application operable on contactless cards or other devices having limited memory. The one or more counters 404 may include a numeric counter sufficient to store an integer. The customer identifier 407 may include a unique alphanumeric identifier assigned to a user of the contactless card 101/101', and the customer identifier 407 may distinguish the user of the contactless card 101/101' from other contactless card users. In some examples, the customer identifier 407 may identify both a customer and an account assigned to that customer and may further identify the contactless card associated with the customer's account. As stated, the account numbers 408 may include thousands of one-time use virtual account numbers associated with the contactless card 101/101'.

The processor and memory elements of the foregoing exemplary examples are described with reference to the contact pad 420, but the present disclosure is not limited thereto. It is understood that these elements may be implemented outside of the contact pad 420 or entirely separate from it, or as further elements in addition to microprocessor 430 and memory 402 elements located within the contact pad 420.

In some examples, the contactless card 101/101' may include one or more antennas 455. The one or more antennas 455 may be placed within the contactless card 101/101' and around the processing circuitry 425 of the contact pad 420. For example, the one or more antennas 455 may be integral with the processing circuitry 425 and the one or more antennas 455 may be used with an external booster coil to provide a communications interface 431. As another example, the one or more antennas 455 may be external to the contact pad 420 and the processing circuitry 425.

In an example, the coil of contactless card 101/101' may act as the secondary of an air core transformer. A terminal, such as the card reader 148 on the mobile device 110 of FIG. 1 may communicate with the contactless card 101/101' by cutting power or amplitude modulation. The contactless card 101/101' may gather the data transmitted from a point-of-sale terminal (not shown in this example) or the card reader 148 using gaps in the contactless card's power connection, which may be functionally maintained through one or more capacitors. The contactless card 101/101' may communicate back by switching a load on the contactless card's coil via load modulation that is detectable by. Load modulation may be detected in the terminal's coil. More generally, using the antennas 455, processing circuitry 425, and/or information stored in the memory 402, the contactless card 101/101' provides a communications interface 431 to communicate via, respective, NFC, Bluetooth, and/or Wi-Fi communication protocols. If the contactless card 101/101' is so equipped to provide Bluetooth and Wi-Fi communications, the Bluetooth and Wi-Fi communications may be provided via transceivers 435. The communication pro As explained above, contactless cards 101/101' may be built on a software platform operable on smart cards or other devices having limited memory, such as JavaCard, and one or more or more applications or applets may be securely executed. Applets 440 may be added to contactless cards to provide a one-time password (OTP) for multifactor authentication (MFA) in various mobile application-based use cases. Applets 440 may be operable to respond to one or more requests, such as near field data exchange requests, from a reader, such as a mobile NFC reader (e.g., of the mobile device 110), and produce an NDEF message that includes a cryptographically secure OTP encoded as an NDEF text tag.

One example of an NDEF OTP is an NDEF short-record layout (SR=1). In such an example, one or more applets 440 may be operable to encode the OTP as an NDEF type 4 well known type text tag. In some examples, NDEF messages may include one or more records. The applets 440 may be operable to add one or more static tag records in addition to the OTP record.

In some examples, the one or more applets 440 may be operable to emulate a radio frequency identification (RFID) tag. The RFID tag may include one or more polymorphic tags. In some examples, each time the tag is read, different cryptographic data is presented that may indicate the authenticity of the contactless card. Based on the one or more applications, an NFC read of the RFID tag may be processed, the data may be transmitted to a server, such as the server 120, and the data may be validated at the server.

In some examples, the contactless card 101/101' and server 120 may include certain data such that the card may be properly identified. The contactless card 101/101' may include one or more unique identifiers (not pictured). Each time a read operation takes place, the counters 404 may be operable to increment. In some examples, each time data from the contactless card 101/101' is read (e.g., by a mobile device 110), the counter 404 is transmitted to the server for validation and determines whether the counter values 404 are equal (as part of the validation).

The one or more counters 404 may be operable to prevent a replay attack. For example, if a cryptogram has been obtained and replayed, that cryptogram is immediately rejected if the counter 404 has been read or used or otherwise passed over. If the counter 404 has not been used, it may be replayed. In some examples, the counter that is incremented on the card is different from the counter that is incremented for transactions. The contactless card 101/101' is unable to determine the application transaction counter 404 since there is no communication between applets 440 on the contactless card 101/101'. In some examples, the contactless card 101/101' may include a first applet, which may be a transaction applet, and a second applet. Each of the first applet and the second applet may include a respective counter 404.

In some examples, the counter 404 may become unsynchronized with the server, such as 120 of FIG. 1. In some examples, to account for accidental reads that initiate transactions, such as reading at an angle, the counter 404 may increment but the application does not process the counter 404. In some examples, when the mobile device 110 is woken up, the card reader 148 (which in this example operates as an NFC device) may be enabled and the mobile device 110 may be operable to read available tags, but no action is taken responsive to the reads.

To keep the counter 404 in synchronization, an application, such as a background application, may be executed that would be operable to detect when the mobile device 110 wakes up and synchronize with the server 120 indicating that a read that occurred due to detection to then increment the counter 404. In other examples, Hashed One Time Password may be utilized such that a window of mis-synchronization may be accepted. For example, if within a threshold of 10, the counter 404 may be operable to move forward. But if within a different threshold number, for example within 10 or 1000, a request for performing re-synchronization may be processed which requests via one or more applications that the user tap, gesture, or otherwise indicate one or more times via the user's device. If the counter 404 increases in the appropriate sequence, then it possible to know that the user has done so.

The key diversification technique described herein with reference to elements of FIGS. 1A and 1B, such as the counter 104, master key 105, and diversified key 106 is one example of encryption and/or decryption a key diversification technique. This example key diversification technique should not be considered limiting of the disclosure, as the disclosure is equally applicable to other types of key diversification techniques.

During the creation process of the contactless card 101/101', two cryptographic keys may be assigned uniquely per card. The cryptographic keys may include symmetric keys which may be used in both encryption and decryption of data. Triple DES (3DES) algorithm may be used by EMV and it is implemented by hardware in the contactless card 101/101'. By using the key diversification process, one or more keys may be derived from a master key based upon uniquely identifiable information for each entity that requires a key.

In some examples, to overcome deficiencies of 3DES algorithms, which may be susceptible to vulnerabilities, a session key may be derived (such as a unique key per session) but rather than using the master key, the unique card-derived keys and the counter may be used as diversification data. For example, each time the contactless card 101/101' is used in operation, a different key may be used for creating the message authentication code (MAC) and for performing the encryption. This results in a triple layer of cryptography. The session keys may be generated by the one or more applets and derived by using the application transaction counter 404 with one or more algorithms (as defined in EMV 4.3 Book 2 A1.3.1 Common Session Key Derivation).

Further, the counter increment for each card 101/101' may be unique, and assigned either by personalization, or algorithmically assigned by some identifying information. For example, contactless cards 101/101' ending in odd number may be operable to increment counters by 2 and contactless cards 101/101' ending in even numbered cards may increment counters by 5. In some examples, the increment may also vary in sequential reads, such that one card may increment counters in sequence by 1, 3, 5, 2, 2, . . . repeating. The specific sequence or algorithmic sequence may be defined at time of issuance or another personalization time, or from one or more processes derived from unique identifiers. The specific sequence or algorithmic sequence can make it harder for a replay attacker to generalize from a small number of card instances.

The authentication message may be delivered as the content of a text NDEF record in hexadecimal ASCII format. In another example, the NDEF record may be encoded in hexadecimal format.

If the tap of the contactless card 101 is directed to a device running Apple's iOS® operating system, e.g., an iPhone, iPod, or iPad, the contactless card can recognize the iOS® operating system and transmit data appropriate data to communicate with this device. For example, the contactless card contactless cards 101/101' ending in can provide the encrypted identity information necessary to authenticate the card using NDEF tags via, e.g., NFC. Similarly, if the contactless card tap is directed to a mobile device 110 running the Android® operating system, e.g., an Android® smartphone or tablet, the contactless card contactless cards 101/101' ending in can recognize the Android® operating system and transmit appropriate and data to communicate with this device (such as the encrypted identity information necessary for authentication by the methods described herein).

Figure 5:
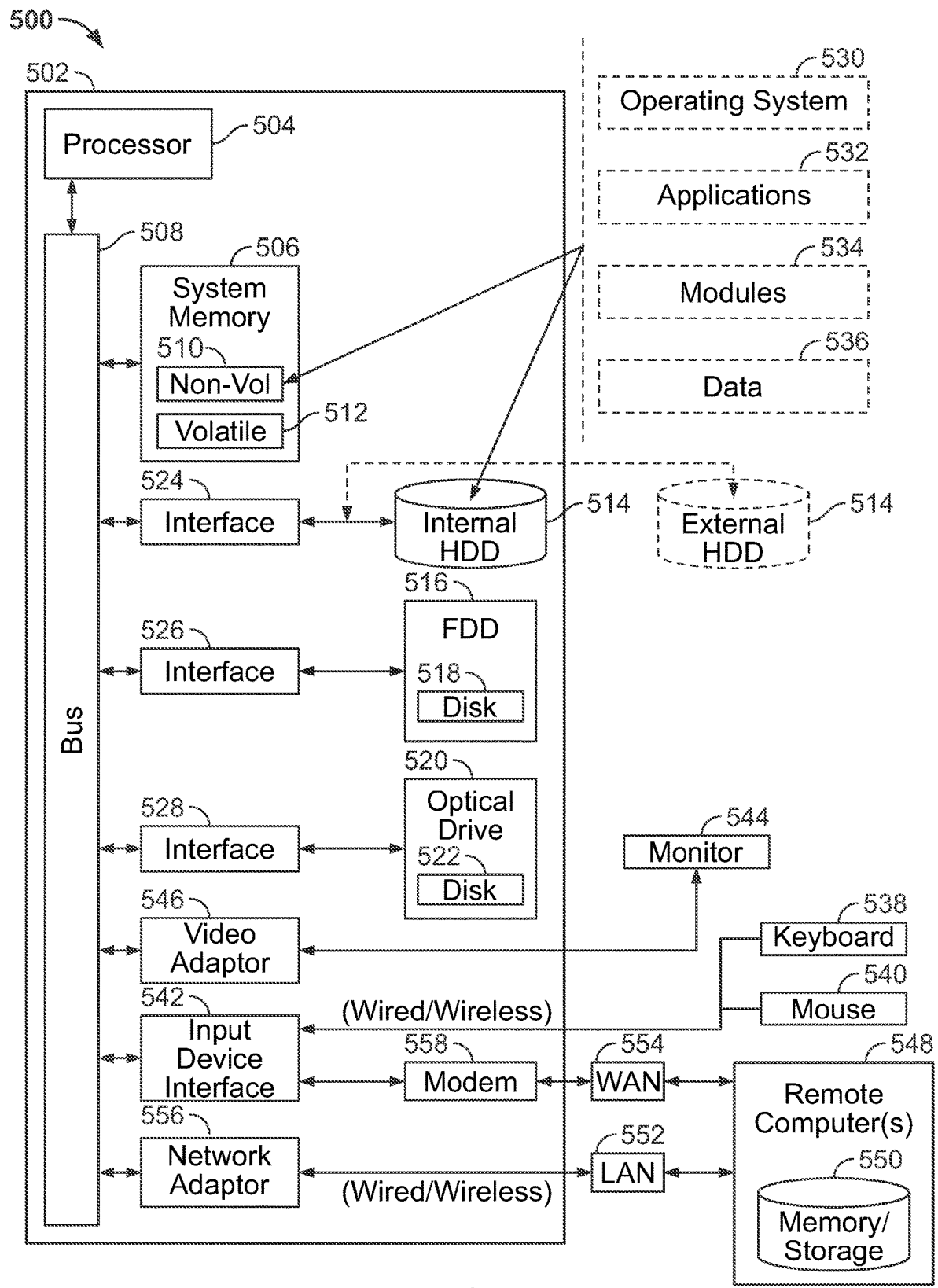
FIG. 5 illustrates an example of a mobile device suitable for implementing the examples of FIGS. 1-4.

FIG. 5 illustrates an example of an exemplary computing architecture 500 comprising a computing system 502 that may be suitable for implementing various examples as previously described. In various examples, the computing architecture 500 may include or be implemented as part of an electronic device. In some examples, the computing architecture 500 may be representative, for example, of a system that implements one or more components of the system 100. In some examples, computing system 502 may be representative, for example, of the mobile devices 110 and server 120 of the system 100. The examples are not limited in this context. More generally, the computing architecture 500 is operable to implement all logic, applications, systems, methods, apparatuses, and functionality described herein with reference to FIGS. 1-6.

As used in this application, the terms "system" and "component" and "module" are intended to refer to a computer-related entity, either hardware, a combination of hardware and software, software, or software in execution, examples of which are provided by the exemplary computing architecture 500. For example, a component can be, but is not limited to being, a process running on a computer processor, a computer processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further examples, however, may alternatively employ data messages. Such data messages may be sent across various connections. Exemplary connections include parallel interfaces, serial interfaces, and bus interfaces.

The computing system 502 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The examples, however, are not limited to implementation by the computing system 502.

As shown in FIG. 5, the computing system 502 includes a processor 504, a system memory 506 and a system bus 508. The processor 504 can be any of various commercially available computer processors, including without limitation an AMD® Athlon®, Duron® and Opteron® processors; ARM® application, embedded and secure processors; IBM® and Motorola® DragonBall® and PowerPC® processors; IBM and Sony® Cell processors; Intel® Celeron®, Core®, Core (2) Duo®, Itanium®, Pentium®, Xeon®, and XScale® processors; and similar processors. Dual microprocessors, multi-core processors, and other multiprocessor architectures may also be employed as the processor 504.

The system bus 508 provides an interface for system components including, but not limited to, the system memory 506 to the processor 504. The system bus 508 can be any of several types of bus structure that may further interconnect to a memory bus (with or without a memory controller), a peripheral bus, and a local bus using any of a variety of commercially available bus architectures. Interface adapters may connect to the system bus 508 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The system memory 506 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory (e.g., one or more flash arrays), polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated example shown in FIG. 5, the system memory 506 can include non-volatile memory 510 and/or volatile memory 512. A basic input/output system (BIOS) can be stored in the non-volatile memory 510.

The computing system 502 may include various types of computer-readable storage media in the form of one or more lower speed memory units, including an internal (or external) hard disk drive (HDD) 514, a magnetic floppy disk drive (FDD) 516 to read from or write to a removable magnetic disk 518, and an optical disk drive 520 to read from or write to a removable optical disk 522 (e.g., a CD-ROM or DVD). The HDD 514, FDD 516 and optical disk drive 520 can be connected to the system bus 508 by an HDD interface 524, an FDD interface 526 and an optical drive interface 528, respectively. The HDD interface 524 for external drive implementations can include at least one or both of Universal Serial Bus (USB) and IEEE 1394 interface technologies. The computing system 502 is generally is operable to implement all logic, systems, methods, apparatuses, and functionality described herein with reference to FIGS. 1-7.

The drives and associated computer-readable media provide volatile and/or nonvolatile storage of data, data structures, computer-executable instructions, and so forth. For example, a number of program modules can be stored in the drives and memory units 510, 512, including an operating system 530, one or more application programs 532, other program modules 534, and program data 536. In one example, the one or more application programs 532, other program modules 534, and program data 536 can include, for example, the various applications and/or components of the system 100, e.g., the operating system 142, account authentication application 143, unlock-lock application 144, other applications 145 and the management application 123.

A user can enter commands and information into the computing system 502 through one or more wire/wireless input devices, for example, a keyboard 538 and a pointing device, such as a mouse 540. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processor 504 through an input device interface 542 that is coupled to the system bus 508 but can be connected by other interfaces such as a parallel port, IEEE 1394 serial port, a game port, a USB port, an IR interface, and so forth.

A monitor 544 or other type of display device is also connected to the system bus 508 via an interface, such as a video adaptor 546. The monitor 544 may be internal or external to the computing system 502. In addition to the monitor 544, a computer typically includes other peripheral output devices, such as speakers, printers, and so forth.

The computing system 502 may operate in a networked environment using logical connections via wire and/or wireless communications to one or more remote computers, such as a remote computer 548. The remote computer 548 can be a workstation, a server computer, a router, a personal computer, portable computer, microprocessor-based entertainment appliance, a peer device or other common network node, and typically includes many or all of the elements described relative to the computing system 502, although, for purposes of brevity, only a memory/storage device 550 is illustrated. The logical connections depicted include wire/wireless connectivity to a local area network (LAN) 552 and/or larger networks, for example, a wide area network (WAN) 554. Such LAN and WAN networking environments are commonplace in offices and companies, and facilitate enterprise-wide computer networks, such as intranets, all of which may connect to a global communications network, for example, the Internet. In examples, the network 130 of FIG. 1 is one or more of the LAN 552 and the WAN 554.

When used in a LAN networking environment, the computing system 502 is connected to the LAN 552 through a wire and/or wireless communication network interface or adaptor 556. The adaptor 556 can facilitate wire and/or wireless communications to the LAN 552, which may also include a wireless access point disposed thereon for communicating with the wireless functionality of the adaptor 556.

When used in a WAN networking environment, the computing system 502 can include a modem 558, or is connected to a communications server on the WAN 554 or has other means for establishing communications over the WAN 554, such as by way of the Internet. The modem 558, which can be internal or external and a wire and/or wireless device, connects to the system bus 508 via the input device interface 542. In a networked environment, program modules depicted relative to the computing system 502, or portions thereof, can be stored in the remote memory/storage device 550. It will be appreciated that the network connections shown are exemplary and other means of establishing a communications link between the computers can be used.

The computing system 502 is operable to communicate with wired and wireless devices or entities using the IEEE 802 family of standards, such as wireless devices operatively disposed in wireless communication (e.g., IEEE 802.16 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.11x (a, b, g, n, etc.) to provide secure, reliable, fast wireless connectivity. A Wi-Fi network can be used to connect computers to each other, to the Internet, and to wire networks (which use IEEE 802.3-related media and functions).

FIG. 6 illustrates an example of a mobile device usable for implementing the techniques and processes discussed with reference to the examples of FIGS. 1-5.

The mobile device 611 may be a smart phone including a display device, such as a touch screen display 620. The touch screen display 620 may be coupled to the processor 612 and be operable to present screen content and receive inputs via touch sensors 622. Examples of touch screen type mobile devices, such as mobile device 611, may include (but are not limited to) a smart phone, personal digital assistant (PDA), tablet computer, smart watch, or another portable device. However, the structure and operation of mobile device 611 that utilizes a touch screen is provided by way of example; and the subject technology as described herein is not intended to be limited thereto. For purposes of this discussion, FIG. 6 provides a block diagram illustration of an example of the mobile device 611 having a touch screen display for displaying content and receiving user input as (or as part of) the user interface.

There are a variety of ways that a mobile device 611 may be operable to obtain information as to current location of the device. In our example, the mobile device 611 includes a global positioning satellite (GPS) receiver 632 and associated antenna 634. GPS is a space-based satellite navigation system that provides location and time information practically anywhere on Earth. A rechargeable battery 629 may provide electrical power sufficient to power the various components of the mobile device 611.

A mobile device supporting the sale notification application and techniques described herein may include a variety of different types of user interface elements. For discussion purposes, in the smart phone example of a mobile device shown in FIG. 6, the user interface elements of mobile device 611 include a touch screen display 620 (also referred to herein as "touch screen 620" or "display 620"). For output purposes, the touch screen 620 includes a display screen, such as a liquid crystal display (LCD) or the like. For input purposes, touch screen display 620 includes a plurality of touch sensors 622. Other interface elements may include a keypad including one or more keys 630. For example, the keypad may be implemented in hardware as a T9 or QWERTY keyboard of mobile device 611 and keys 630 may correspond to the physical keys of such a keyboard. Alternatively, keys 630 (and keyboard) of mobile device 611 may be implemented as "soft keys" of a virtual keyboard graphically represented in an appropriate arrangement via touch screen display 620. The soft keys presented on the touch screen display 620 may allow the user of mobile device 611 to invoke the same user interface functions as with the physical hardware keys. In some implementations, the microphone 602 and speaker 604 may be used as additional user interface elements, for audio input and output, including with respect to some functions related to the processing related to engaging with the sale notification application 647, as described herein. In a further example, the sale notification application 647 may in response to accessing contacts stored in the mobile device memory 614, present in the user interface, such as 425 of FIG. 4B, a prompt to send a request to one or more of the contacts to join an affinity reward group.

For output, touch screen display 620 is a display device used to present information (e.g., text, video, graphics or other visible content) to the user of mobile device 611. Processor 612 controls visible display output on the LCD or other display element of the touch screen display 620 via a display driver 624, to present the various visible outputs to the device user. In addition, an output device may include for example, a speaker 604, a vibration mechanism 631, the touchscreen display 620, or the like.

In general, touch screen display 620 and touch sensors 622 (and one or more keys 630, if included) are used to provide the textual and graphical user interface for the mobile device 611. In an example, touch screen display 620 provides viewable content to the user at mobile device 611. Touch screen display 620 also enables the user to interact directly with the viewable content provided in the content display area, typically by touching the surface of the screen with a finger or an implement such as a stylus.

As shown in FIG. 6, the mobile device 611 also includes a touch detect circuit 628 coupled to touch sensors 622 for detecting the occurrence and relative location/position of each touch with respect to a content display area of touch screen display 620. In this example, touch detect circuit 628 is operable to provide processor 612 with touch-position information based on user input received via touch sensors 622. In some implementations, processor 612 is operable to correlate the touch position information to specific content being displayed within the content display area on touch screen display 620. The touch-position information captured by touch detect circuit 628 and provided to processor 612 may include, but is not limited to, coordinates identifying the location of each detected touch with respect to the display area of touch screen display 620 and a timestamp corresponding to each detected touch position.

In the example shown in FIG. 6, the mobile device 611 includes a microphone 602 for audio signal input and a speaker 604 for audio signal output. The microphone 602 and speaker 604 are communicatively coupled to a voice or audio encoder/decoder (vocoder) 606. For a voice telephone call, for example, the vocoder 606 provides two-way conversion between analog audio signals representing speech or other audio and digital samples at a compressed bit rate compatible with the digital protocol of wireless telephone network communications or voice over packet (e.g., Internet Protocol) communications. The vocoder, speaker and microphone may also be used as elements of the user interface during other operations of the device, including some types of transaction communications.

Also, as shown in FIG. 6, the mobile device 611 includes at least one transceiver (XCVR) 608, which may be a digital transceiver for digital wireless communications via a wide area wireless mobile communication network, although the mobile device 611 may include additional digital or analog transceivers (not shown). The transceiver 608 conforms to one or more of the various digital wireless communication standards utilized by modern mobile networks. Examples of such transceivers include (but are not limited to) transceivers operable to operate in accordance with Code Division Multiple Access (CDMA) and 3rd Generation Partnership Project (3GPP) network technologies including, for example and without limitation, 3GPP type 2 (or 3GPP2) and 3GPP Long Term Evolution (LTE), at times referred to as "4G." For example, transceiver 608 provides two-way wireless communication of information including digitized audio signals, still image and/or video signals, web page information for display as well as web related inputs, and various types of mobile message communications to/from the mobile device 611. Transceiver 608 connects through radio frequency (RF) send-and-receive amplifiers (not separately shown) to an antenna 609. Transceiver 608 may also support various types of mobile messaging services, such as short message service (SMS), enhanced messaging service (EMS), and/or multimedia messaging service (MMS).

In an example, the transceiver 608 may be coupled to the processor 612 and operable to exchange communications. The processor 612 of the mobile device 611 may be further operable to perform additional functions, including functions to establish, using the transceiver, a connection with a server, such as affinity exchange server 45 of FIG. 1, to exchange communications. Via the connection with the server, the mobile device 611 may be able to obtain various information, such as an affinity reward exchange rate, a neutral affinity reward value, affinity aggregation account-related information, and the like. The processor upon execution of the sale notification application 647 may implement the examples as discussed above with reference to FIGS. 1-5.

The mobile device 611 may also include a Wi-Fi transceiver 610 and associated antenna 633. Although Wi-Fi is used here as the example, the transceiver 610 may take the form of any available two-way wireless local area network transceiver of a type that is compatible with one or more standard protocols of communication implemented in wireless local area networks, such as one of the Wi-Fi standards under IEEE 802.11 and/or WiMAX.

The mobile device 611 further includes a processor 612, which serves as a programmable controller for mobile device 611 by configuring mobile device 611 to perform various operations, for example, in accordance with instructions or programming executable by processor 612. For example, such operations may include various general operations of the mobile device 611 as well as operations related to the screen brightness adjustment as described herein. A flash memory 614 may be used to store, for example, programming or instructions for execution by the processor 612. Depending on the type of device, the mobile device 611 stores and runs an operating system through which specific applications may be run on the device. Examples of operating systems include Android, Apple iOS, Microsoft Windows OS, Bada, Tizen, Symbian OS, Blackberry OS, or the like. Flash memory 614 may also be used to store mobile configuration settings for different mobile applications or services executable at mobile device 611 (using processor 612). Mobile device 611 may also include a non-volatile random-access memory (RAM) 616 for a working data processing memory. The RAM memory 616 or storage 637 may be coupled to the processor 612 and operable to store programming code executable by the 612 processor.

Alternatively, or in addition, applications may be stored in storage 637, which may be a solid-state memory storage or other memory device suitable for storing applications. In one example, the storage 637 may be a separate chip that includes tamperproof storage and execution memory and is operable to communicate with operating system. The storage 637 may, for example, store an instance of a sale notification application 647 for processing receipt data, communicating with one or more services or servers, and processes as described with reference to the examples of FIGS. 1-3. Other applications such as 642 and 644 may also be stored in storage 637.

The logic implemented by the processor 612 of the mobile device 611 configures the processor 612 to control various functions as implemented by the mobile device 611. The logic for a processor may be implemented in a variety of ways, but in the presented examples, the processor logic is implemented by programming for execution by the processor 612.

Various examples may be implemented using hardware elements, software elements, or a combination of both.

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an example is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one example may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Some examples may be implemented, for example, using a machine-readable medium or article which may store an instruction or a set of instructions that, if executed by a machine, may cause the machine to perform a method and/or operations in accordance with the examples. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, magneto-optical media, removable memory cards or disks, various types of Digital Versatile Disk (DVD), a tape, a cassette, or the like. The instructions may include any suitable type of code, such as source code, compiled code, interpreted code, executable code, static code, dynamic code, encrypted code, and the like, implemented using any suitable high-level, low-level, object-oriented, visual, compiled and/or interpreted programming language.

The foregoing description of examples has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto. Future filed applications claiming priority to this application may claim the disclosed subject matter in a different manner and may generally include any set of one or more limitations as variously disclosed or otherwise demonstrated herein.

What is claimed is:

1. An apparatus, comprising:
   a display device;
   a processor circuit, wherein the processor circuit is operable to present a graphical user interface on the display device;
   a transceiver coupled to the processor circuit and operable to communicate with external devices;
   a card reader circuit coupled to the processor circuit, and operable to emit and receive signals within a signal field; and
   a memory coupled to the processor circuit and operable to store instructions which when executed by the processor circuit, causes the processor circuit to:
     obtain a location of the apparatus and a plurality of user preference settings, the user preference settings comprising a list of merchants at the obtained location;
     dynamically determine, based on the location of the apparatus and the user preference settings that a card unlock action is required to meet an imminent card present transaction at one or more of the list of merchants;
     in response, transmit an indication, via the card reader circuit, to a contactless card to generate encrypted data using a master key and a counter value as inputs to a cryptographic algorithm;
     receive, via the card reader circuit, the encrypted data from the contactless card, wherein the contactless card is locked to prevent use in a card present transaction;
     transmit, to an authentication server, a request comprising the encrypted data to authenticate and unlock the contactless card;
     receive, from the authentication server in response to the request, an unlock indication that the contactless card has been unlocked enabling the contactless card for use in a card present transaction, wherein the unlock indication indicates the contactless card has been authenticated by the authentication server based on the authentication server decrypting the encrypted data using the master key and the counter value;
     based on the unlock indication, obtain from the user preference settings for uses of the contactless card in payment card transactions when unlocked, wherein the user preference settings are permitted contactless card use restrictions;
     present a representation of the obtained user preference settings of the contactless card in the graphical user interface presented on the display device;
     enable completion of a card present transaction according the obtained user preference settings including a permitted contactless card use restriction; and
     require a subsequent unlock operation in response to the authentication server automatically re-locking the contactless card to prevent further card present transactions per a default setting.

2. The apparatus of claim 1, wherein the memory operable to store the instructions which when executed by the processor circuit, cause the processor circuit to:
   drive a display device to present a graphical user interface with the plurality of user preference settings for setting a limiting use of the contactless card.

3. The apparatus of claim 1, the memory operable to store the instructions which when executed by the processor circuit, cause the processor circuit to:
    present, via a graphical user interface, a plurality of limiting uses of the contactless card for a selection of a user preference setting that sets a limiting use of the contactless card.

4. The apparatus of claim 3, wherein the plurality of limiting uses includes one or more of:
    a geographical location, a geo-fenced area, a merchant name, a price threshold, a time threshold, a day of a week, a time range within a day, a zip code, an area code; a merchant category, or a product category.

5. The apparatus of claim 3, the memory operable to store the instructions which when executed by the processor circuit, cause the processor circuit to:
    receive, via a graphical user interface, a selection of a user preference that sets the limiting use of the contactless card.

6. The apparatus of claim 1, further comprising:
    a location application operable to determine a location of the apparatus, wherein the memory is operable to store the plurality of user preference settings of a unlock-lock application and further instructions which when executed by the processor circuit, cause the processor circuit, to:
        obtain a location preference setting from the plurality of user preference settings stored in the memory;
        obtain location data from the location application executing on the processor circuit;
        send the obtained location preference setting and the obtained location data to an unlock-lock server;
        receive a list of merchants satisfying the obtained location preference setting based on the obtained location data; and
        present the list of merchants in the graphical user interface on the display device.

7. The apparatus of claim 1, further comprising:
    an output device coupled to the processor circuit and operable to generate a sound or a vibration;
    a location application operable to determine a location of the apparatus and executable by the processor, wherein the memory is operable to store a plurality of user preference settings of a unlock-lock application and further instructions which when executed by the processor circuit, cause the processor circuit, to:
        determine, based on a location provided by the location application, that a card unlock action is required to meet an imminent card present transaction; and
        generate, via the output device or the display device, a notification indicating the card unlock action is required.

8. The apparatus of claim 1, wherein the memory is operable to store the plurality of user preference settings of a unlock-lock application and further instructions which when executed by the processor circuit, cause the processor circuit, to:
    present on the graphical user interface a menu of user preference settings for selection by a user, wherein the user preference settings are permitted uses of the contactless card, when unlocked, in card present transactions;
    receive an indication of a selection of one or more of the user preference settings presented in the menu; and
    provide, to a server operable to manage user preferences of the unlock-lock application, user preference settings indicated as selected for permitted use of the unlocked contactless card in card present transactions.

9. The apparatus of claim 8, wherein the indication of the selection of one or more of the user preference settings includes:
    a time range selection, wherein the time range selection identifies a time range during which the contactless card remains unlocked;
    a radius selection, wherein the radius selection identifies a distance from a user's location in which the contactless is permitted to be used in a card-present transaction; or
    a merchant code selection, wherein the merchant code selection identifies a category of goods or services provided by merchants assigned a merchant code selected via the merchant code selection.

10. A system, comprising:
    a mobile device including a mobile device processor, a mobile device memory, a transceiver, a display device, and a card reader circuit, the card reader circuit is operable to communicate with a contactless payment card via a communications interface; and
    a contactless card, including a processor, a memory storing programming code, and a communications interface operable to support at least one of near field communication, Bluetooth, or Wi-Fi communication protocol, wherein the memory stores a counter related to a number of times the contactless card exchanges data;
    wherein execution of the programming code by the processor of the contactless card, configures the processor to:
        in response to a request received, via the communications interface, from the mobile device, generate encrypted data using a master key and the counter value as inputs to a cryptographic algorithm; and
        emit, via the communications interface, a signal containing encrypted data usable to authenticate the contactless card, and
    wherein:
        the mobile device memory stores programming code including an instance of an unlock-lock application, wherein the programming code when executed by the mobile device processor causes the mobile device processor to perform functions, including functions to:
        obtain a location of the mobile device and user preferences associated with the contactless card, the user preferences comprising a list of merchants at the obtained location;
        determine, based on the location of the mobile device and the user preferences that a card unlock action is required to meet an imminent card present transaction at one or more of the list of merchants;
        receive, from the card reader circuit, the signal containing the encrypted data emitted from the contactless card;
        transmit, to an authentication server, a request comprising the encrypted data for authentication and unlocking of the contactless card;
        receive, from the authentication server in response to the request, an unlock indication indicating the contactless card is unlocked, wherein the unlock indication indicates the contactless card has been authenticated by the authentication server based on the authentication server decrypting the encrypted data using the master key and the counter value;

based on the unlock indication, and the user preferences that allow limited uses of the contactless card when unlocked for use in card-present transactions, wherein the user preferences are permitted contactless card use restrictions;

present a representation of the obtained user preferences of the contactless card, when unlocked, in a graphical user interface presented on the display device;

enable completion of the card present transaction according to the obtained user preferences including a permitted contactless card use restriction; and require a subsequent unlock operation in response to the authentication server automatically re-locking the contactless card to prevent further card present transactions per a default setting.

11. The system of claim 10, wherein the processor of the contactless card upon execution of the programming code is further operable to:

generate an encrypted data using the cryptographic algorithm stored in the memory of the contactless card, wherein the cryptographic algorithm uses one of: a number of times the contactless card is used in a card present transaction or a number of times the contactless card is authenticated.

12. The system of claim 10, further comprising:

an authentication server coupled to a memory storing a cryptographic algorithm, the authentication server operable to execute programming code, wherein the authentication server when executing the programming code is operable to:

receive the encrypted data from the mobile device, wherein the mobile device is authorized to communicate with the authentication server;

decrypt the encrypted data;

verify the decrypted data to authenticate the contactless card;

generate, based on a verification of the decrypted data, the unlock indication that the contactless card is unlocked; and output the unlock indication to the mobile device.

13. The system of claim 10, further comprising:

a unlock-lock server hosting an instance of an unlock-lock application operable to manage user preferences of the unlock-lock application, wherein the user preferences are provided by the instance of the unlock-lock application stored in the memory of the mobile device is executed by the mobile device processor; and a location application stored in the mobile device memory and operable to determine a location of the mobile device, wherein the mobile device processor when executing the unlock-lock application is configured to:

determine a location of the mobile device; and provide the determined location of the mobile device to the unlock-lock server; and wherein the unlock-lock server is operable to:

receive, from the mobile device, user preference settings indicated as selected for permitted uses of the contactless card in card present transactions, when the contactless card is unlocked;

obtain the determined location of the mobile device from the mobile device;

retrieve a location setting from the user preference settings, wherein the location setting is a radius from a predetermined location;

access a merchant location service based on the user preference settings;

obtain from the merchant location service a list of merchants based on the retrieved location setting and the determined location;

generate a list of merchants based on the retrieved location setting and the determined location of the mobile device; and forward the generated list of merchants to the mobile device.

14. The system of claim 10, further comprising:

a payment account component operable to authorize purchases involving the contactless card, wherein the payment account component is operable to maintain a maximum transaction amount threshold for use in authorizing or denying purchases involving the contactless card; and an unlock-lock server operable to manage user preferences of the unlock-lock application executing on the mobile device processor, wherein the unlock-lock server is operable to:

receive, from the mobile device, user preference settings indicated as selected, permitted uses of the unlocked contactless card in card present transactions;

derive a maximum transaction amount threshold from the user preference settings;

forward, to the payment account component, a maximum transaction amount threshold derived from the user preference settings; and forward the maximum transaction amount threshold to the mobile device for presentation in the graphical user interface.

15. The system of claim 10, wherein the contactless card when unauthenticated is locked which makes the contactless card unusable in a card present transaction and authenticated indicates the contactless card is valid and unlocked which makes that contactless card usable in a card present transaction.

16. A non-transitory computer-readable storage medium having computer-readable program code embodied therewith, wherein the computer-readable program code is executable by a processor circuit to cause the processor circuit to:

in response to a communication with a contactless card, transmit an indication, via a card reader circuit of a mobile device, to the contactless card to generate encrypted data using a master key and a counter value as an input into a cryptographic algorithm;

receive, via a card reader circuit, encrypted data from a communications interface of a contactless card, wherein the contactless card is locked from being used in a card present transaction;

transmit, to an authentication server, a request comprising the encrypted data to unlock the contactless card;

receive, from the authentication server in response to the request, an unlock indication that the contactless card has been unlocked for use in a card present transaction based on the authentication server decrypting the encrypted data using the master key and the counter value;

based on the unlock indication, obtain user preferences that allow limited uses of the contactless card when unlocked for use in card-present transactions, wherein the user preferences include a permitted contactless card use restriction of a capability of the contactless card to complete a payment card transaction;

present an unlocked-for-use status indication and a representation of the permitted contactless card use restriction in a graphical user interface presented on a display device;

enable completion of a card present transaction according the obtained user preferences including a permitted contactless card use restriction;

obtain a location preference setting from a plurality of user preference settings;

obtain, from a location application, location data, wherein the location data includes a position, a timestamp and a velocity;

send the obtained location preference setting and the obtained location data to an unlock-lock server;

receive a list of merchants satisfying the obtained location preference setting based on the obtained location data;

present the list of merchants in the graphical user interface on the display device;

determine, based on the location data provided by the location application, a card unlock action is required to meet an imminent card present transaction;

generate instructions to produce a notification indicating the card unlock action is required; and output a notification actuation signal operable to actuate an output device or a display device according to the generated instructions; and require a subsequent unlock operation in response to the authentication server automatically re-locking the contactless card to prevent further card present transactions per a default setting.

17. The non-transitory computer-readable storage medium of claim 16, further comprising computer-readable program code executable by the processor circuit to cause the processor circuit to:

drive a display device to present a graphical user interface with a plurality of user preferences for setting the limiting use of the contactless card.

18. The non-transitory computer-readable storage medium of claim 16, further comprising computer-readable program code executable by the processor circuit to cause the processor circuit to:

present, via a graphical user interface, a plurality of limiting uses of the contactless card for selection user preferences for the contactless card when unlocked, wherein the plurality of limiting uses includes one or more of: a geographical location, a geo-fenced area, a merchant name, a price threshold, a time threshold, a day of a week, a time range within a day, a zip code, an area code; a merchant category, or a product category;

receive, via the graphical user interface, a selection of at least one of the plurality of limiting uses; and store the selection as a user preference of the contactless card, when unlocked.

* * * * *